United States Patent
Latheef et al.

(10) Patent No.: US 12,004,027 B2
(45) Date of Patent: Jun. 4, 2024

(54) METHOD AND APPARATUS FOR HANDLING RADIO LINK FAILURE IN WIRELESS COMMUNICATION SYSTEM

(71) Applicant: Samsung Electronics Co., Ltd., Suwon-si (KR)

(72) Inventors: Fasil Abdul Latheef, Calicut (IN); Mangesh Abhimanyu Ingale, Bangalore (IN); Himke Van Der Velde, Zwolle (NL); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/310,526

(22) PCT Filed: Feb. 7, 2020

(86) PCT No.: PCT/KR2020/001751
§ 371 (c)(1),
(2) Date: Aug. 6, 2021

(87) PCT Pub. No.: WO2020/162704
PCT Pub. Date: Aug. 13, 2020

(65) Prior Publication Data
US 2022/0038968 A1 Feb. 3, 2022

(30) Foreign Application Priority Data

Feb. 8, 2019 (IN) .............................. 201941005101
Feb. 3, 2020 (IN) .............................. 201941005101

(51) Int. Cl.
*H04W 36/00* (2009.01)

(52) U.S. Cl.
CPC ..... *H04W 36/0079* (2018.08); *H04W 36/0058* (2018.08); *H04W 36/0061* (2013.01); *H04W 36/00837* (2018.08)

(58) Field of Classification Search
CPC ......... H04W 36/0079; H04W 36/0058; H04W 36/0061; H04W 36/00837; H04W 36/305
See application file for complete search history.

(56) References Cited

U.S. PATENT DOCUMENTS

| 9,924,419 B2 | 3/2018 | Moon et al. |
| 11,265,778 B2 | 3/2022 | Moon et al. |

(Continued)

FOREIGN PATENT DOCUMENTS

| CN | 106537971 A | 3/2017 |
| KR | 10-2015-0110407 A | 10/2015 |
| WO | 2018/203710 A1 | 11/2018 |

OTHER PUBLICATIONS

Park et al., "Handover Mechanism in NR for Ultra-Reliable Low-Latency Communications," in IEEE Network, vol. 32, No. 2, pp. 41-47, Mar.-Apr. 2018 (Year: 2018).*

(Continued)

*Primary Examiner* — Un C Cho
*Assistant Examiner* — Lalita W Pace

(57) ABSTRACT

Embodiments herein disclose a method for handling a RLF in a wireless communication system by a UE (100). The method includes receiving a measurement configuration including a second timer (150) from a SN (300). Further, the method includes configuring the UE with the second timer associated with a measurement report for a PSCell of the SN. Further, the method includes starting the second timer when the measurement report is triggered while a first timer (140) for the PSCell is running. Further, the method includes detecting an expiry of one of: the first timer and the second timer for the PSCell. Further, the method includes declaring (Continued)

a SCG RLF upon expiry of one of: the first timer and the second timer whichever is early. Further, the method includes initiating a SCG failure procedure towards a MN (300) upon declaring SCG RLF.

4 Claims, 13 Drawing Sheets

(56) References Cited

U.S. PATENT DOCUMENTS

| | | | | |
|---|---|---|---|---|
| 2015/0271717 | A1* | 9/2015 | Moon | H04W 76/18 |
| | | | | 455/437 |
| 2015/0327107 | A1 | 11/2015 | Kim et al. | |
| 2017/0048898 | A1* | 2/2017 | Jung | H04W 36/0088 |
| 2017/0127331 | A1* | 5/2017 | Wu | H04W 36/305 |
| 2018/0160339 | A1 | 6/2018 | Wu | |
| 2018/0184362 | A1 | 6/2018 | Babaei et al. | |
| 2019/0166646 | A1* | 5/2019 | Shih | H04W 72/04 |
| 2019/0215756 | A1* | 7/2019 | Park | H04W 24/10 |
| 2019/0253949 | A1* | 8/2019 | Park | H04W 36/305 |
| 2019/0254096 | A1* | 8/2019 | Wu | H04W 76/34 |
| 2020/0178331 | A1* | 6/2020 | Xu | H04W 76/16 |
| 2020/0337103 | A1* | 10/2020 | Harada | H04W 76/27 |
| 2020/0359241 | A1* | 11/2020 | Siomina | H04B 7/0617 |
| 2020/0359251 | A1* | 11/2020 | Gunnarsson | H04W 56/007 |
| 2021/0092623 | A1* | 3/2021 | Wu | H04W 56/001 |
| 2021/0127447 | A1* | 4/2021 | Zhang | H04W 80/02 |
| 2021/0314826 | A1* | 10/2021 | Chang | H04W 36/0079 |
| 2021/0321277 | A1* | 10/2021 | Murray | H04L 5/0048 |
| 2021/0377755 | A1* | 12/2021 | Luo | H04W 24/04 |
| 2022/0038929 | A1* | 2/2022 | Tsuboi | H04W 76/15 |

OTHER PUBLICATIONS

International Search Report and Written Opinion of the International Searching Authority in connection with International Application No. PCT/KR2020/001751 dated May 18, 2020, 7 pages.
ETSI TS 138 331 V15.4.0 (Apr. 2019), 5G; Nr; Radio Resource Control (RRC); Protocol specification (3GPP TS 38.331 version 15.4.0 Release 15) ,Apr. 2019, 471 pages.
ETSI TS 136 331 V15.3.0 (Oct. 2018), LTE; Evolved Universal Terrestrial Radio Access (E-UTRA); Radio Resource Control (RRC); Protocol specification (3GPP TS 36.331 version 15.3.0 Release 15) , Oct. 2018, 916 pages.
Ericsson, Email discussion summary [104#64][NR] Running 38.331 CR for Late drop, Tdoc R2-19xxxxx, 3GPP TSG-RAN WG2 #105, Athens, Greece, Feb. 25-Mar. 1, 2019, 38 pages.
Samsung, "Discussion on SCG failure Information message in MR-DC", R2-1818321, 3GPP TSG-RAN WG2 Meeting RAN2#104, Spokane, Washington, USA, Nov. 12-16, 2018, 3 pages.
Supplementary European Search Report dated Nov. 4, 2020, in connection with European Patent Application No. 20712436.3, 11 pages.
Samsung, "Dual connectivity RRC procedural specification, miscellaneous issues", 3GPP TSG-RAN2#86 meeting, Tdoc R2-142446, Seoul, South Korea, May 19-23, 2014, 4 pages.
Huawei et al., "RLF for NR", 3GPP TSG-RAN WG2-NR Adhoc#2, R2-1706745, Qingdao, China, Jun. 27-29, 2017, 7 pages.
Nokia et al., "Remaining Details for SeNB Failure Reporting", 3GPP TSG-RAN WG2 Meeting #87bis, R2-144363, Shanghai, China, Oct. 6-10, 2014, 8 pages.
Korean Intellectual Property Office, "Notice of Non-Final Rejection," dated Aug. 9, 2022, in connection with Korean Patent Application No. 10-2021-7011454, 10 pages.
European Patent Office, "Supplementary European Search Report," dated Jul. 6, 2022, in connection with European Patent Application No. 22162168.3, 12 pages.
Ericsson, "MCG failure handling in case of NE-DC and NN-DC (TP to 37.340)," 3GPP TSG-RAN WG2 #103 R2-1812017, Gothenburg, Sweden, Aug. 20-24, 2018, 5 pages.
3GPP TS 36.331 V15.4.0 (Dec. 2018); Technical Specification; 3rd Generation Partnership Project; Technical Specification Group Radio Access Network; Evolved Universal Terrestrial Radio Access (E-UTRA); Radio Resource Control (RRC); Protocol specification (Release 15); 933 pages.
3GPP TS 38.331 V15.4.0 (Dec. 2018); Technical Specification; 3rd Generation Partnership Project; Technical Specification Group Radio Access Network; NR; Radio Resource Control (RRC) protocol specification (Release 15); 474 pages.
Intellectual Property India, "Examination report under sections 12&13 of the Patents Act," dated Feb. 24, 2022, in connection with Indian Patent Application No. 201941005101, 7 pages.
Korean Intellectual Property Office, "Decision to Refuse," dated Feb. 21, 2023, in connection with Korean Patent Application No. 10-2021-7011454, 9 pages.
Office Action issued Feb. 27, 2024, in connection with Chinese Patent Application No. 202080013076.1, 13 pages.
OPPO, "Discussion on T312 for PSCell," 3GPP TSG-RAN WG2 Meeting #107bis, R2-1912402, Chongqing, China, Oct. 2019, 2 pages.

* cited by examiner

METHOD AND APPARATUS FOR HANDLING RADIO LINK FAILURE IN WIRELESS COMMUNICATION SYSTEM

CROSS-REFERENCE TO RELATED APPLICATIONS

This application is a 371 of International Application No. PCT/KR2020/001751, filed Feb. 7, 2020, which claims priority to Indian Patent Application No. 201941005101, filed Feb. 8, 2019, and Indian Patent Application No. 201941005101, filed Feb. 3, 2020, the disclosures of which are herein incorporated by reference in their entirety.

BACKGROUND

1. Field

The present disclosure relates to a wireless communication system, and more specifically related to a method and user equipment (UE) for detecting early radio link failure (RLF) and enabling faster recovery in new radio (NR) of a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a method and UE to detect early RLF and enable faster recovery in a NR.

Embodiments herein disclose a method for handling a RLF in a wireless communication system by a UE (100). The method includes receiving a measurement configuration including a second timer (150) from a SN (300). Further, the method includes configuring the UE with the second timer associated with a measurement report for a PSCell of the SN. Further, the method includes starting the second timer when the measurement report is triggered while a first timer (140) for the PSCell is running. Further, the method includes detecting an expiry of one of: the first timer and the second timer for the PSCell. Further, the method includes declaring a SCG RLF upon expiry of one of: the first timer and the second timer whichever is early. Further, the method includes initiating a SCG failure procedure towards a MN (300) upon declaring SCG RLF.

By the method of the present application, the service interruption time for bearers handled by the SCG is minimized.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
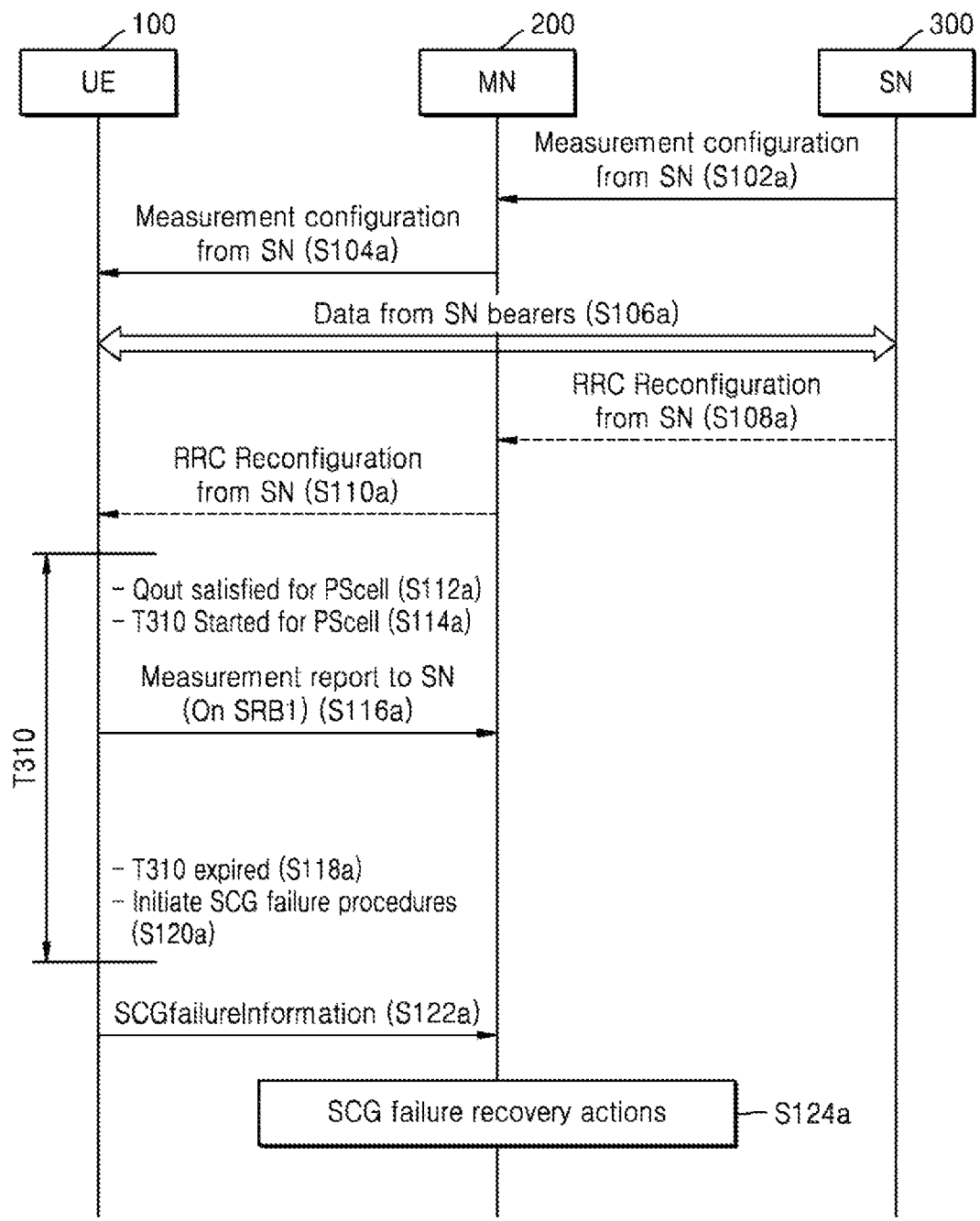
FIG. 1A is a flow diagram illustrating step by step operations for PSCell RLF and SCG failure indication in MR-DC scenario where UE is configured with SRB only on MCG PCell, according to prior art.

Accordingly, embodiments herein disclose a method for handling a RLF in a wireless communication system. The method includes receiving, by a UE, a measurement configuration including a second timer from a secondary node (SN). Further, the method includes configuring the UE with the second timer associated with a measurement report for a PSCell of the SN. Further, the method includes starting, by the UE, the second timer when the corresponding measurement report is triggered while the first timer for the PSCell is running. Further, the method includes detecting, by the UE, an expiry of one of: the first timer and the second timer for the PSCell. Further, the method includes declaring, by the UE, a secondary cell group (SCG) RLF upon expiry of the first timer or the second timer whichever is early. Further, the method includes initiating, by the UE, a secondary cell group (SCG) failure procedure towards a Master Node (MN) upon declaring SCG RLF.

In an embodiment, further, the method includes notifying, by the UE, a SCG failure message to the master node over a SRB1 via a Master Cell Group (MCG) link upon declaring the SCG RLF. The SCG failure message includes a cause value corresponding to failure type as one of: the expiry of the first timer and the expiry of the second timer. Further, the method includes triggering, by the MN, a recovery of the Secondary Cell Group (SCG) radio link failure (RLF) based on the SCG failure message.

In an embodiment, further, the method includes setting, by the UE, a failure type as one of a first timer expiry and a second timer expiry.

In an embodiment, the UE sets the failure type as the first timer expiry, if the expiry of the first timer is before the expiry of the second timer, else the UE sets the failure type as the second timer expiry, if the expiry of the second timer is before the expiry of the first timer.

In an embodiment, further the method includes receiving, by the UE, a measurement object and reporting configuration from the SN including a second timer, wherein the second timer is associated with the measurement report for the PSCell of the SN.

In an embodiment, determining, by the UE, the triggering of the measurement report for the PSCell associated with the second timer while a first timer for the PSCell is running, and starting, by the UE, the second timer for the PScell.

In an embodiment, the measurement report for the PSCell is sent to the secondary node (SN) over one of a Signaling Radio Bearer type 1 (SRB1) and a Signaling Radio Bearer type 3 (SRB3).

In an embodiment, declaring, by the UE, the SCG RLF based on the detection of the expiry of the first timer or the second timer whichever is early, and stopping the other timer which is not expired.

In an embodiment, initiating, by the UE, the SCG failure procedure based on the declaration of the SCG RLF.

In an embodiment, the first timer is a T310 timer wherein the first timer is included during SCG addition and the second timer is T312 timer wherein the second timer is included in the measurement configuration from the SN.

In an embodiment, triggering, by the MN, the recovery of the SCG RLF based on the SCG failure message includes receiving, by the UE, a RRC reconfiguration message from the master node over on SRB1.

Accordingly, embodiments herein disclose a UE for handling a RLF in a wireless communication system. The UE includes a processor coupled with a memory. The processor receives a measurement configuration including a second timer from a secondary node (SN). The method includes configures the UE with a second timer associated with a measurement report for a PSCell of the SN. Further, the processor starts the second timer when the corresponding measurement report is triggered while the first timer for the PSCell is running. The processor detects an expiry of one of the first timer and the second timer for the PSCell. The processor declares SCG RLF upon expiry of the first timer or the second timer whichever is early. Further, the processor initiates a SCG failure procedure upon the declaration of SCG RLF.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In recent years, several advancements in wireless communication technologies has been made in order to meet the growing broadband demand and the advent of new applications and services. The second generation of wireless communication system was developed to provide voice service in a mobile environment. The third generation enhanced this further with the support of data along with voice in the mobile environment. In recent years, the fourth generation wireless communication system has been developed to provide high speed broadband data in mobility environment. However, the advancements in fourth generation communication system (Long term evolution—LTE) suffers from lack of resources and methods to meet the growing demand for broadband and new use cases. Therefore, the fourth generation communication system is being further advanced and also the fifth generation (New Radio—NR) is being developed in order to meet this growing need for broadband with enhanced mobile broadband (eMBB) while also supporting new use cases like ultra-reliable low latency commination (URLLC) and massive machine type communication (mMTC).

The NR is an orthogonal frequency-division multiplexing (OFDM)-based air interface designed to support the wide variation of 5G device-types, services, deployments and spectrum. The network monitors the device behavior and provides the necessary resources to a mobile device (e.g., UE or the like) to perform any operation it requires (data—uplink or downlink, calls etc.). The signal strength and quality experienced by the mobile device varies according to the proximity of the mobile device with the gNB. The UE's near the cell are expected to have a better signal condition compared to the ones which are far from the gNB i.e. cell edge situation.

The network (i.e., RAN Node)—gNodeB in the NR (gNB)/eNB in the LTE always maintains a context on the mobile device that are in active RRC connection with it. At any point of time, the gNB can handover the mobile device/the UE from its control (i.e., source cell) to another gNB or another cell (i.e., target cell), thus transferring the entire context of the particular device to the target cell. This decision is taken by the network optionally based on assistance received from the UE, with the help of measurement reports about neighbor cells. (i.e., gNB configures the mobile device to measure the signal condition of the serving cell and neighboring cells that may belong to a different gNB). There is a specific measurement criteria, and a specific reporting criteria to the network, both of which are configured by the serving gNB itself. Due to multiple reasons like weak signal condition, heavy load on serving gNB etc., the serving gNB can handover the device to the neighbor cell or the target gNB and this could be done based on assistance received from the UE in form of measurement reports.

The UE is continuously monitoring the quality of its radio link to ensure that the link is sufficiently in good conditions to successfully receive any transmission from a base station and to successfully make transmissions to the base station. When the UE identifies that that link quality has gone weak, the radio resource management (RRM) functionality performing radio link monitoring (RLM) at physical (PHY) layer sends out of synchronization (sync) indications to higher layers (i.e. RRC layer) thereby indicating the higher layer about the degradation in radio link quality. Once the link degradation condition reaches the allowed limit i.e. a configured threshold condition, the UE enters a state of outage i.e. poor radio conditions where the UE experience Qout (out of sync indication from radio resource manager) due to high block error rate. The current specifications provision the use of a configured T310 timer in this state. The UE declares radio link failure (RLF) on the expiry of this timer T310 and initiates cell selection procedure to attempt recovery. This timer value is kept long enough to give the UE sufficient opportunity to recover from the outage state and get back to good radio link quality with the in sync indications from the PHY layer. On the other hand, the T310 timer is configured short enough to trigger recovery on another cell and not impact the user service significantly i.e. minimize service interruption time.

Typically, this state of outage or the bad radio link state where Qout is satisfied, occurs when the UE is moving towards a cell edge of the serving cell. Therefore, it is very likely that there is a neighbor cell to whose coverage the UE is entering into. As a result, it is ideal that the network configures handover initiating measurement report such that there is sufficient time for the network to process the measurement report, prepare the target cell for handover and to provide handover command before the radio link of the serving cell becomes too weak to decode the handover command from the network correctly. However, even after good network planning and network optimization there are some practical cases where the direction, speed of each UE are different and the cell coverage are not optimal in which case it may become too complex to come up with a configuration that is ideal to all the UEs in the cell. The reporting configuration for the configured measurement is set such that there is no increased amount of signaling due to measurement reports. The network configure measurement reporting such that an action has to be taken based on the report from the UE. In most cases, this results in handover and hence the network configures such measurements to be reported only in cases where a handover is required by the UE. This sometimes leads to increased probability of the UE entering the state of experiencing Qout before the measurement report is triggered (due to unpredictability of the wireless channel and other factors such as UE mobility and speed).

The 3GPP study on HetNet Mobility Enhancements for the LTE concluded that handover performance in HetNet deployments is worse than that in homogeneous macro deployments. In a dense HetNet environment, increased number of handovers and the RLF could result in larger service interruption time for the UE due to several factors including RLF recovery interruption and Qout during the T310. Having a short value of T310 being configured for the UE could result in cases where the UE declares the RLF prior to the measurement report being sent to the network. This type of configuration eludes the UE from having the opportunity to request for handover or to recover from Qout. Therefore, the value of T310 is generally kept larger. It could also happen that the UE has satisfied the reporting criteria for a configured neighbor frequency and sent measurement report to the network soon after T310 is started at the UE. There is good possibility network will prepare target cell of handover and send the handover command to the UE but the UE being in out of sync may not be able to receive the handover command. Eventually, the UE would declare the RLF after the expiry of T310. However, the triggering of measurement report by the UE is an indication of neighbor cell with good radio conditions being available in the vicinity. Therefore, a mechanism for fast handover failure recovery/early radio link failure detection was introduced with the configuration of T312 timer where the UE declares radio link failure before T310 timer expiry i.e. upon expiry of T312 timer. This early decision is made so that the UE is provided with sufficient opportunity to return to in sync state and the network is provided enough opportunity to prepare handover with the target cell. The T312 timer was introduced and configured by the network for controlling this behavior which is expected to minimize the service interruption time. When the RLF timer T310 is running and a measurement report is triggered by the UE for a combination of measurement object and reporting configuration requiring the UE to use T312 timer based behavior, the UE starts the timer T312. When T312 expires, the UE declares early RLF procedure and attempts for recovery of radio link. However, such early recovery is feasible in the master cell group (MCG) but not in the secondary cell group (SCG) in the dual connectivity configuration. The RLF on the SCG is also referred to as the SCG failure and both terminologies are inter-changeably used here after in the disclosure. With the flexibility in configuration of the Dedicated Radio Bearers (DRBs) in dual connectivity architectures supported in the NR, the lower layer i.e. RLC leg can be flexibly configured in either MCG or SCG or both and can be associated with a packet data convergence protocol (PDCP) entity terminated either at the master node or secondary node. Therefore, if SCG failure is encountered on the PSCell in the SCG, it makes sense to recover early to minimize the service interruption time for bearers handled by the SCG.

Thus, it is desired to address the above mentioned disadvantages or other shortcomings or at least provide a useful alternative.

Accordingly embodiments herein disclose a method for handling a RLF in a wireless communication system. The method includes receiving, by a UE, a measurement configuration including a second timer from a secondary node (SN). Further, the method includes configuring the UE with the second timer associated with a measurement report for a PSCell of the SN. Further, the method includes starting, by the UE, the second timer when the corresponding measurement report is triggered while the first timer for the PSCell is running. Further, the method includes detecting, by the UE, an expiry of one of: the first timer and the second timer for the PSCell. Further, the method includes declaring, by the UE, a secondary cell group (SCG) RLF upon expiry of the first timer or the second timer whichever is early. Further, the method includes initiating, by the UE, a secondary cell group (SCG) failure procedure towards a Master Node (MN) upon declaring SCG RLF.

The proposed method can be used to detect early RLF and enable faster recovery in NR. The method can be used to the T312 in RRCR configuration using RLF-Timers and constants in spCellConfig. The method can be used to indicate SCG failure cause due to T312 expiry.

The proposed method introduces T312 based mechanism on the PSCell for fast declaration of the SCG failure. This can facilitate less service interruption time for the bearers configured over the SCG by expediting the SCG recovery based on shorter T312 timer.

Based on the proposed methods, when T312 expires for PSCell (i.e. secondary node with NR PSCell), the UE does not perform RRC re-establishment procedure but sends the SCG Failure message to the network. The SCG failure message includes the cause value corresponding to T312 expiry. For PSCell RLF, the RRC Connection is already good on the PCell (i.e. MN) but the data on the PSCell (i.e. SN) is lost. The UE attempts to restore the data on the SCG by autonomously sending the cause for the failure without the need for the NW to inquire. The SCG Failure message is sent to the Master Node (i.e. MN) on SRB1 via MCG link, regardless of the SCG measurement are configured via SRB1 or SRB3.

The various embodiments of the proposed method is adopted in the 3GPP TS 38.331.

Referring now to the drawings, and more particularly to FIGS. 2A through 7, there are shown preferred embodiments.

FIG. 1A is a sequential flow diagram illustrating a method for PSCell RLF and SCG failure indication in a MR-DC scenario, where the UE (100) is configured with a SRB only on a MCG PCell, according to prior art.

The UE (100) can be configured with more than one serving cells. This can either be in a carrier aggregation (CA) type of configuration where all the serving cells belong to a same cell group (CG) served by a same gNB or in a dual connectivity configuration where the serving cells could be from two different cells groups (CGs i.e. MCG and SCG) served by two different gNBs. Radio link monitoring (RLM)

is performed only on primary cell (PCell) in the carrier aggregation (CA) case and on both primary cell and the primary secondary cell (PSCell) in dual connectivity (DC) case. The PCell and PSCell are special cells and generally referred as Special cell i.e. SpCell.

In an embodiment, method can be used to detect the RLF or perform a SCG failure recovery on the PSCell (use of T312 on the PScell/the SCG). When the UE (100) is configured with a LTE dual connectivity i.e. (LTE-DC), all the measurement configuration and measurement reports are exchanged between the UE (100) and the eNB over signaling radio bearer 1 (SRB1). The master node (MN) is aware of the secondary node (SN) configuration and can comprehend them. The MN appends the configuration received from the SN and sends to the UE (100) in the RRC reconfiguration message. Any measurement report sent by the UE (100) will terminate at the MN eNB.

However, with the introduction and development of NR technology, the way the SN configuration handled has changed. The NR supports multiple dual connectivity based deployments types which includes EUTRA-NR Dual Connectivity (EN-DC) where the MN is LTE eNB connected EPC and SN is NR gNB, NG-RAN E-UTRA-NR Dual Connectivity (NGEN-DC) where the MN is LTE ng-eNB connected to the 5GC and SN is NR gNB, NR-E-UTRA Dual Connectivity (NE-DC) where the MN is NR gNB connected to 5GC and SN is LTE ng-eNB and NR-NR Dual Connectivity (NR-DC) where MN is NR gNB connected to 5GC and SN is NR gNB. These are collectively referred to as Multi-Radio Dual Connectivity (MR-DC). In the MR-DC, when Signaling Radio Bearers (SRB) are present only on the MN, the SN configurations are transparent to the MN and the MN cannot comprehend these configurations. The MN encapsulates the received SN configuration and sends in the reconfiguration message to the UE (100). When the SRB3 hosted in the SN is configured to the UE (100) i.e. UE (100) is configured with both MN and SN hosted independent SRBs, the SN configuration is not sent to the MN and the SN directly sends RRC reconfiguration message to the UE (100) on the SRB3. Therefore, the MN and the SN can send independent reconfiguration message to the UE (100).

Figure 1B:
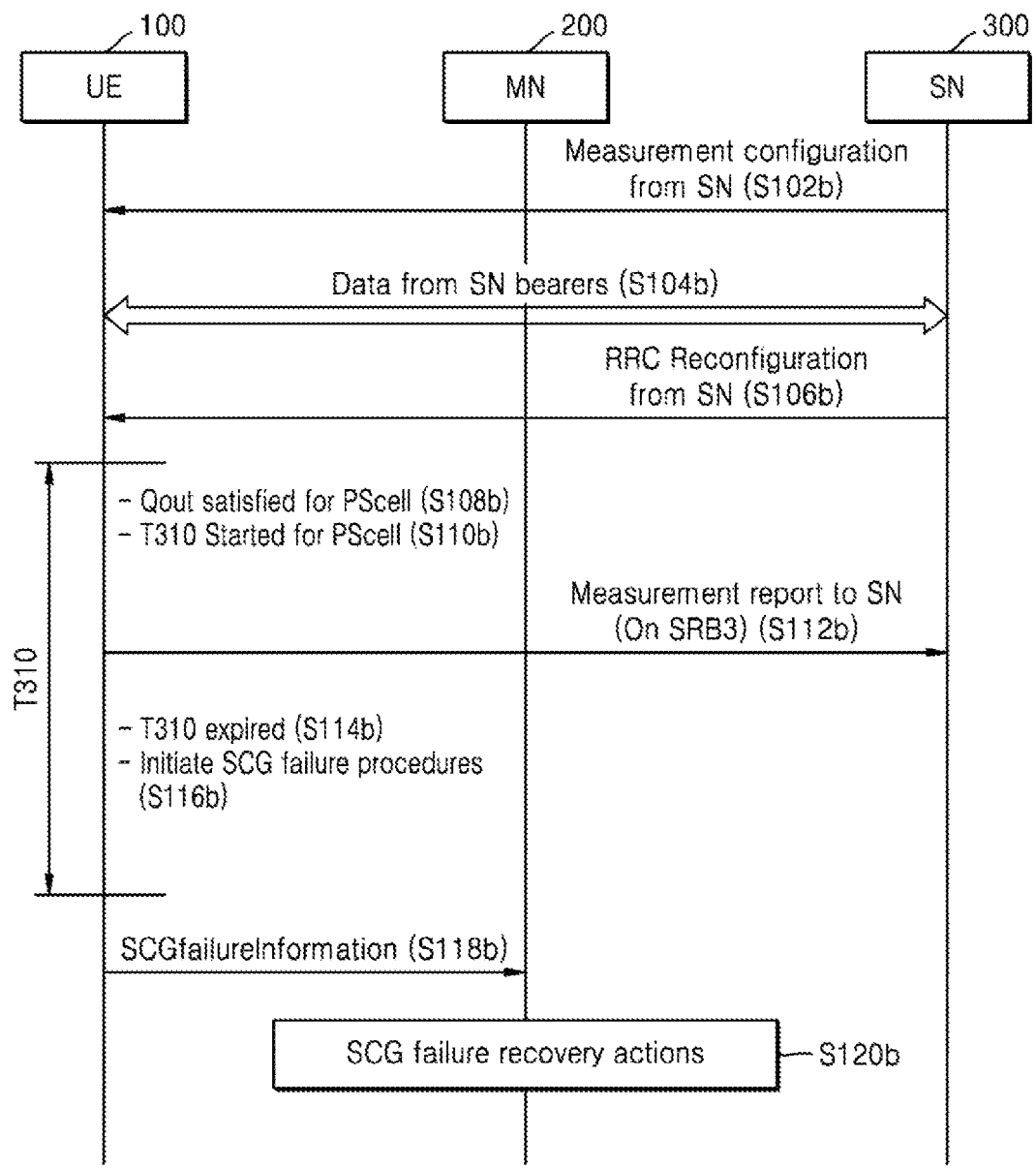
FIG. 1B is a flow diagram illustrating step by step operations for PSCell RLF and SCG failure indication in MR-DC scenario where UE is configured with SRB1, SRB2 on MCG PCell and SRB3 on SCG PSCell, according to prior art.

On both PCell and PSCell, the UE (100) monitors RLM. When Qout condition is satisfied, the T310 is started for the cell and the RLF is declared once T310 expires. Timer based early detection is possible based on when the measurement report is triggered for the measurement object-reporting configuration combination that is required to use T312. In LTE T312 based behavior is applied only to the primary cell (PCell) even in cases where the UE (100) is configured with dual connectivity operation i.e. LTE DC configuration. In MR-DC, PSCell RLF detection is based on T310 itself as illustrated in the FIG. 1A and FIG. 1B. The FIG. 1A illustrates the case where PSCell RLF and SCG failure indication in the MR-DC scenario where the UE (100) is configured with the SRB only on the MCG PCell. The SCG cells served by the SN in the MR-DC may either belong to the EUTRA or the NR. FIG. 1B illustrates the case where the PSCell RLF and the SCG failure indication in the MR-DC scenario where the UE (100) is configured with SRB1, SRB2 on the MCG PCell and SRB3 on the SCG PSCell. The SCG cells in this case belongs to the NR.

In an example, at S102*a*, the SN (300) sends a measurement configuration to a MN (200). At S104*a*, the MN (200) sends the measurement configuration to the UE (100). At S106*a*, the data from SN bearers is established between the UE (100) and the SN (300). At S108*a*, the SN (300) sends a RRC reconfiguration to the MN 200. At S110*a*, the MN (300) sends the RRC reconfiguration to the UE (100). At S112*a*, the UE (100) detects the Qout for the PSCell. At S114*a*, the UE (100) starts the timer (i.e., T310) for the PScell. At S116*a*, the UE (100) sends a measurement report to a MN (200) over the Signaling Radio Bearer type 1 (SRB1) message. S118*a*, the timer T310 is expired and the UE (100) initiates a secondary cell group (SCG) failure procedure at S120*a*. At S112*a*, the UE (100) shares the SCG failure information to the MN (200). At S124*a*, the MN (200) initiates the SCG failure recovery actions.

FIG. 1B is a sequential flow diagram illustrating step by step operations for PSCell RLF and SCG failure indication in the MR-DC scenario, where the UE (100) is configured with SRB1, SRB2 on the MCG PCell and SRB3 on the SCG PSCell, according to prior art.

The function and operations of the FIG. 1B is describe above in conjunction with the FIG. 1A. In an example, at S102*b*, the SN (300) sends the measurement configuration to the UE (100). At S104*b*, the data from the SN bearers is established between the UE (100) and the SN (300). At S106*b*, the SN (300) sends the RRC reconfiguration to the UE (100). At S108*b*, the UE (100) detects the Qout for the PSCell. At S110*b*, the UE (100) starts the timer (i.e., T310) for the PScell. At S112*b*, the UE (100) sends the measurement report to the SN (300) over the SRB3 message. At S114*b*, the timer is expired and the UE (100) initiates the SCG failure procedure at S116*b*. At S118*b*, the UE (100) shares the SCG failure information to the MN (200). At 120*b*, the MN (200) initiates the SCG failure recovery actions.

Figure 2A:
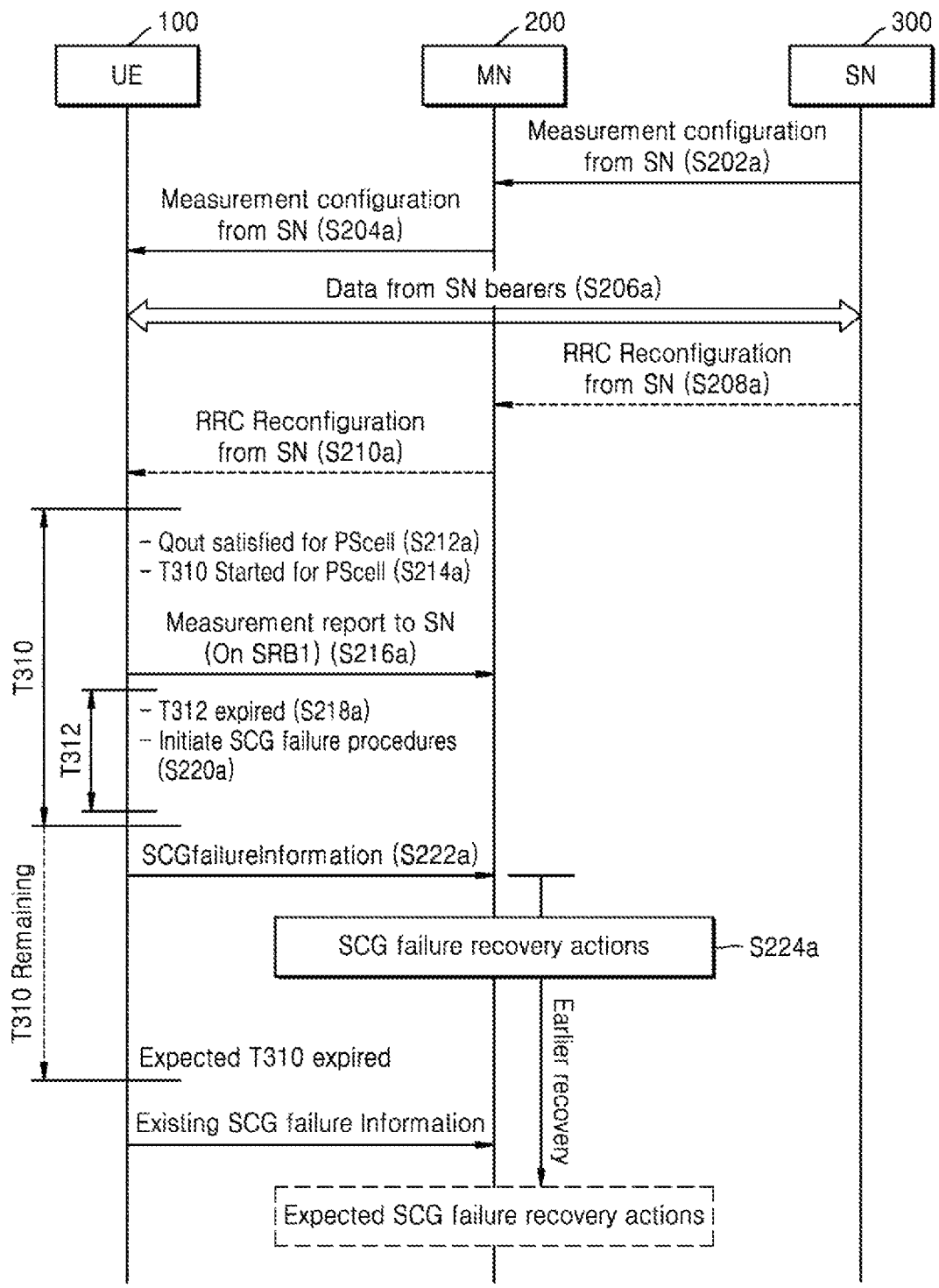
FIG. 2A is a flow diagram illustrating step by step operations for early SCG failure indication to MN in MR-DC scenario where SRBs are configured only on MCG where the MCG and SCG cells may belong to either EUTRAN or NR, according to an embodiment as disclosed herein.

FIG. 2A is a sequential flow diagram illustrating step by step operations for early SCG failure indication to the MN in the MR-DC scenario where the SRBs are configured only on the MCG where the MCG and SCG cells may belong to either the EUTRAN or the NR, according to an embodiment as disclosed herein.

The mechanism of declaring RLF early is to provide the UE (100) with opportunity to perform fast recovery. The T312 is used only when the measurement report is triggered for the measurement configuration requiring the use of T312. Typically, this is configured only for handover triggering configurations. Therefore, if the UE (100) has triggered the measurement report, it means that the UE (100) is in vicinity of the cell in better signal conditions, so that handover of ongoing services can be performed. When T312 based early RLF declaration is adopted for the PCell, the UE (100) performs RRC re-establishment earlier (most likely on the target cell indicated in the measurement report) than that in case where only T310 is used. With the RRC re-establishment the target node retrieves the UE context from the old serving node and restores the control and data path for the UE (100) thereby reducing the interruption caused to the UE (100) due to RLF.

Figure 2B:
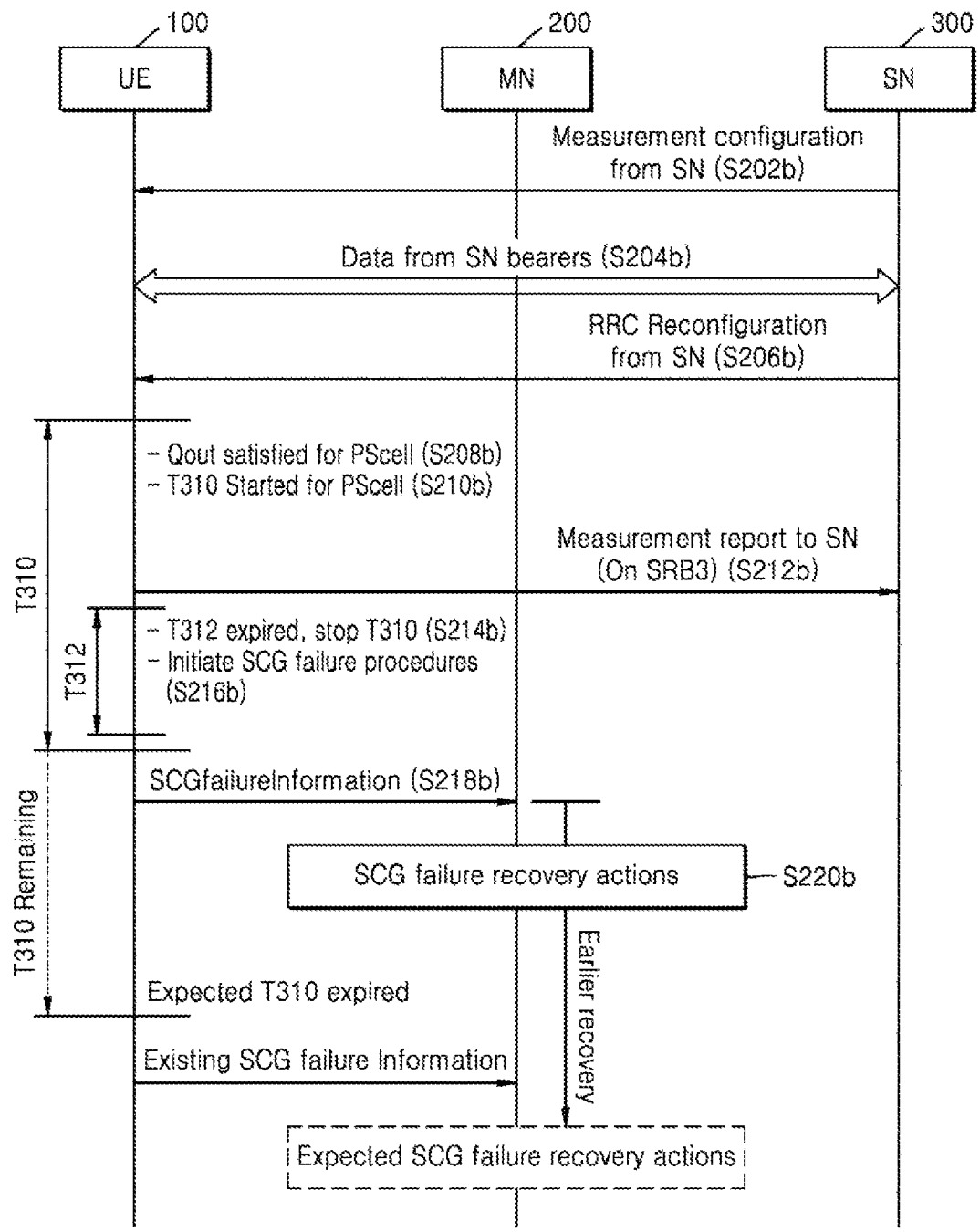
FIG. 2B is a flow diagram illustrating a method for early SCG failure indication to MN in MR-DC scenario where SRB1, SRB2 are configured on MCG and SRB3 is configured on SCG where the MCG cells may belong to either EUTRAN or NR and SCG cells belong to NR, according to an embodiment as disclosed herein.

Similarly, the T312 can be configured for PSCell when the measurement report is triggered for the measurement configuration requiring the use of T312. Typically this will be configured only for the PSCell change triggering condition. Therefore, if the UE (100) configured with MR-DC operation, if the measurement report is triggered for the PSCell change, it means that the UE (100) is in vicinity of the cell in better signal conditions so that the PSCell change can be performed to offload the DRBs handled by serving PSCell. When the T312 based early RLF declaration is adopted for PSCell, the SCG failure is indicated to the MN upon T312 expiry i.e., earlier than what would have been reported if only T310 is used. This fast reporting of SCG failure provides the MN node earlier opportunity to restore the data path that was configured over SN on which the UE (100) encountered PSCell RLF or SCG failure. The MN can restore the DRBs faster by either reconfiguring all the SN terminated PDU sessions or data radio bearers to MN terminated PDU session or data radio bearers, or by preparing another SN and reconfiguring these bearers to the new SN. Since the PDU session/data radio bearer relocation or reconfiguration occurs at an earlier time than that on expiry of T310, it helps to reduce the service interruption timer for the UE (100) thereby providing a better user experience. FIG. 2A and FIG. 2B illustrate the PSCell RLM and SCG failure indication to the MN based on T312 timer. FIG. 2A illustrates early SCG failure indication to the MN in MR-DC scenario where the SRBs are configured only on MCG where the MCG and SCG cells may belong to either EUTRAN or NR. FIG. 2B illustrates early SCG failure indication to the MN in the MR-DC scenario where SRB1, SRB2 are configured on the MCG and the SRB3 is configured on the SCG, where the MCG cells may belong to either EUTRAN or NR and SCG cells belong to the NR.

In an example, at S202a, the SN (300) sends the measurement configuration to the MN (200), where the measurement configuration includes the T312 timer. At S204a, the MN (200) sends the measurement configuration to the UE (100). At 206a, the data from SN bearers is established between the UE (100) and the SN (300). At 208a, the SN (300) sends the RRC reconfiguration to the MN 200. At 210a, the MN (300) sends the RRC reconfiguration to the UE (100). At S212a, the UE (100) detects the Qout for the PSCell. At 214a, the UE (100) starts the timer (i.e., T310) for the PScell. At S216a, the UE (100) sends the measurement report to the MN (200) over the SRB1 message. At 218a, the UE (100) starts the second timer (i.e., T312) and the second timer is expired. At S220a, the UE (100) initiates the SCG failure procedure. At S222a, the UE (100) shares the SCG failure information to the MN (200). At S224a, the MN (200) initiates the SCG failure recovery actions.

FIG. 2B is sequential flow diagram illustrating step by step operations for early SCG failure indication to the MN in the MR-DC scenario where SRB1, SRB2 are configured on the MCG and SRB3 is configured on the SCG, where the MCG cells may belong to either EUTRAN or NR and SCG cells belong to NR, according to an embodiment as disclosed herein.

In SN RRC reconfiguration sent to the UE (100) (either on SRB1 via MN or directly via SRB3), the network configures T312 timer value to the UE (100). This may be configured in one of the ways as following:

1. As part of measurement configuration provided by the SN to the UE (100), or
2. In RLF-TimersAndConstants in spCellConfig via RRC reconfiguration container.

In an embodiment, the method configures the T312 as part of the measurement configuration. The T312 value is normally configured for intra-RAT measurement objects configured for assisting the network in triggering PCell change procedure. However, it needs to be introduced even for the measurement objects that are required for the SCG change or the PSCell change.

Different deployment scenarios may need different time for handover preparation. For instance, the handover preparation time on Xn interface for an intra-gNB PCell change may be different from an inter-gNB based PCell change which can again be different based on admission control procedure related to traffic and load on the target cell. Therefore, it is not optimal to configure the same value of T312 for all these cases. In order to efficiently meet the desired goal of early RLF detection, different T312 values may be configured for different measurement objects. The measurement objects and reporting configuration related to change of SCG or PSCell change should also be allowed to be configured with the T312 timer.

The T312 value may be configured as part of measurement object as illustrated below. In this case, the measurement object for which T312 is set will be related to the frequencies on which PSCell change can be executed to. These are the frequencies served by SN nodes deployed in the network.

```
MeasObjectNR ::=        SEQUENCE {
    ssbFrequency             ARFCN-ValueNR
OPTIONAL,   -- Cond SSBorAssociatedSSB
    ssbSubcarrierSpacing     SubcarrierSpacing       OPTIONAL,  -- Cond
SSBorAssociatedSSB
    smtc1                    SSB-MTC
OPTIONAL,   -- Cond SSBorAssociatedSSB
    ...
    t312-r16                 CHOICE {
        release                  NULL,
        setup                    ENUMERATED {ms0, ms50,
ms100, ms200,
                                             ms300, ms400, ms500,
ms1000}
    }
        OPTIONAL,       -- Need N
    ...
}
``` or

```
MeasObjectNR ::=        SEQUENCE {
    ssbFrequency             ARFCN-ValueNR
OPTIONAL,   -- Cond SSBorAssociatedSSB
    ssbSubcarrierSpacing     SubcarrierSpacing
OPTIONAL,   -- Cond SSBorAssociatedSSB
    smtc1                    SSB-MTC
OPTIONAL,   -- Cond SSBorAssociatedSSB
    ...
    t312-Config-r16          SetupRelease { T312-Config }
    OPTIONAL                 NEED N
    ...
}
T312-Config              SEQUENCE {
    release                  NULL,
    setup                    ENUMERATED {ms0, ms50,
```

```
ms100, ms200,
                        ms300, ms400, ms500
ms1000}
}
``` or

```
MeasObjectNR ::=              SEQUENCE {
    ssbFrequency                  ARFCN-ValueNR
OPTIONAL,   -- Cond SSBorAssociatedSSB
    ssbSubcarrierSpacing          SubcarrierSpacing
OPTIONAL,   -- Cond SSBorAssociatedSSB
    smtc1                         SSB-MTC
OPTIONAL,   -- Cond SSBorAssociatedSSB
```

```
    ...
    t312-r16            ENUMERATED {ms0, ms50, ms100,
ms200, ms300, ms400, ms500, ms 1000}
OPTIONAL,              -- Need R
    ...
}
...
}
```

The application of T312 for the particular measurement report is based on the indication of T312 requirement for the configured reporting configuration. The T312 usage may be configured as a common IE which can be applied for any reporting configuration within the EventTriggerConfig as illustrated below:

```
EventTriggerConfig::=              SEQUENCE {
eventId                            CHOICE {
    eventA1                            SEQUENCE {
        a1-Threshold                       MeasTriggerQuantity,
        reportOnLeave                      BOOLEAN,
        hysteresis                         Hysteresis,
        timeToTrigger                      TimeToTrigger
    },
    eventA2                            SEQUENCE {
        a2-Threshold                       MeasTriggerQuantity,
        reportOnLeave                      BOOLEAN,
        hysteresis                         Hysteresis,
        timeToTrigger                      TimeToTrigger
    },
    eventA3                            SEQUENCE {
        a3-Offset                          MeasTriggerQuantityOffset,
        reportOnLeave                      BOOLEAN,
        hysteresis                         Hysteresis,
        timeToTrigger                      TimeToTrigger,
        useWhiteCellList                   BOOLEAN
    },
    eventA4                            SEQUENCE {
        a4-Threshold                       MeasTriggerQuantity,
        reportOnLeave                      BOOLEAN,
        hysteresis                         Hysteresis,
        timeToTrigger                      TimeToTrigger,
        useWhiteCellList                   BOOLEAN
    },
    eventA5                            SEQUENCE {
        a5-Threshold1                      MeasTriggerQuantity,
        a5-Threshold2                      MeasTriggerQuantity,
        reportOnLeave                      BOOLEAN,
        hysteresis                         Hysteresis,
        timeToTrigger                      TimeToTrigger,
        useWhiteCellList                   BOOLEAN
    },
    eventA6              SEQUENCE {
        a6-Offset                    MeasTriggerQuantityOffset,
        reportOnLeave                BOOLEAN,
        hysteresis                   Hysteresis,
        timeToTrigger                TimeToTrigger,
        useWhiteCellList             BOOLEAN
    },
    ...
},
    rsType                    NR-RS-Type,
    reportInterval            ReportInterval,
    reportAmount              ENUMERATED {r1, r2, r4, r8, r16, r32, r64, infinity},
    reportQuantityCell        MeasReportQuantity,
    maxReportCells            INTEGER (1..maxCellReport),
    reportQuantityRS-Indexes  MeasReportQuantity
OPTIONAL,   -- Need R
    maxNrofRS-IndexesToReport       INTEGER (1..maxNrofIndexesToReport)
OPTIONAL,   -- Need R
    includeBeamMeasurements     BOOLEAN,
    reportAddNeighMeas          ENUMERATED {setup}
OPTIONAL,   -- Need R
    useT312    BOOLEAN    OPTIONAL,         -- Need N
    ...
}
```

Alternatively, the T312 usage can be signaled as a measurement event specific configuration within the EventTriggerConfig as illustrated below. Application of the T312 may be configured for all events independently. The use of T312 is not limited to the illustration below although the main use cases where the network may configure T312 is only for the cases present in the below illustration.

```
EventTriggerConfig::=                   SEQUENCE {
    eventId                                 CHOICE {
        eventA1                                 SEQUENCE {
            a1-Threshold                            MeasTriggerQuantity,
            reportOnLeave                           BOOLEAN,
            hysteresis                              Hysteresis,
            timeToTrigger                           TimeToTrigger
        },
        eventA2                                 SEQUENCE {
            a2-Threshold                            MeasTriggerQuantity,
            reportOnLeave                           BOOLEAN,
            hysteresis                              Hysteresis,
            timeToTrigger                           TimeToTrigger
        },
        eventA3                                 SEQUENCE {
            a3-Offset                               MeasTriggerQuantityOffset,
            reportOnLeave                           BOOLEAN,
            hysteresis                              Hysteresis,
            timeToTrigger                           TimeToTrigger,
            useWhiteCellList                        BOOLEAN
                useT312
    BOOLEAN              OPTIONAL,                        -- Need N
        },
        eventA4                                 SEQUENCE {
            a4-Threshold                            MeasTriggerQuantity,
            reportOnLeave                           BOOLEAN,
            hysteresis                              Hysteresis,
            timeToTrigger                           TimeToTrigger,
            useWhiteCellList                        BOOLEAN
        },
        eventA5                                 SEQUENCE {
            a5-Threshold1                           MeasTriggerQuantity,
            a5-Threshold2                           MeasTriggerQuantity,
            reportOnLeave                           BOOLEAN,
            hysteresis                              Hysteresis,
            timeToTrigger                           TimeToTrigger,
            useWhiteCellList                        BOOLEAN
                useT312
    BOOLEAN        OPTIONAL,              -- Need N
        },
        eventA6                                 SEQUENCE {
            a6-Offset                               MeasTriggerQuantityOffset,
            reportOnLeave                           BOOLEAN,
            hysteresis                              Hysteresis,
            timeToTrigger                           TimeToTrigger,
            useWhiteCellList                        BOOLEAN
        },
        ...
    },
    rsType              NR-RS-Type,
    reportInterval      ReportInterval,
    reportAmount            ENUMERATED {r1, r2, r4, r8, r16, r32, r64, infinity},
    reportQuantityCell  MeasReportQuantity,
    maxReportCells          INTEGER (1..maxCellReport),
reportQuantityRS-Indexes        MeasReportQuantity
OPTIONAL,  -- Need R
maxNrofRS-IndexesToReport           INTEGER (1..maxNrofIndexesToReport)
OPTIONAL,  -- Need R
        includeBeamMeasurements     BOOLEAN,
        reportAddNeighMeas      ENUMERATED {setup}
OPTIONAL,  -- Need R
    ...
}
```

In another embodiment, the method can be used to configure T312 in RRCReconfiguration using RLF-Timers and constants in spCellConfig. In an alternative method, the T312 value can be signaled as a UE specific timer value and not measurement object dependent. In such cases, it is proposed that T312 is configured by the SN as part of spCellConfig used in SCG modification, SCG change and SCG handover scenarios. The method of configuring T312 for PSCell (or SCG) is as illustrated below:

```
RLF-TimersAndConstants ::=    SEQUENCE {
    t310                      ENUMERATED {ms0, ms50, ms100, ms200, ms500, ms1000,
ms2000, ms4000, ms6000},
    n310                      ENUMERATED {n1, n2, n3, n4, n6, n8, n10, n20},
    n311                      ENUMERATED {n1, n2, n3, n4, n5, n6, n8, n10},
    t312    ENUMERATED {ms0, ms50, ms100, ms200,ms300, ms400, ms500, ms1000}
    ...,
    [[
    t311-v1530                ENUMERATED {ms1000, ms3000, ms5000, ms10000, ms15000,
ms20000, ms30000}
    ]]
}
```

In another embodiment, the method can be used to indicate SCG failure cause due to T312 expiry. Once RLF has occurred on the PSCell (i.e. SCG failure), the UE (100) initiates actions related to the SCG failure. The SCG failure information is sent to the MN informing the network about the failure of SCG link thereby indicating to network that recovery actions need to be performed. This failure information additionally carries the trigger or cause for this failure as well. The link failure due to expiry of the T310 is different from that caused due to T312 expiry. The T310 expiry would mean that the UE channel conditions became unsuitable and could not sustain on that cell with the required quality. This does not reflect to the network the presence of a neighbor cell for potential PSCell change. The UE (100) sends the results for all cells it has detected in order to aid the network on the recovery procedures. However, T312 expiry would inform the network that the SCG link failure is due to degradation in the serving PSCell quality but also apprises the network that a neighbor cell with better signal conditions is available in the vicinity. It is possible that the network may change the reporting configuration for these available neighbor cells in the future so that measurement reports may be sent prior to start of T310 timer (prior to serving cell channel degrading to this extent). Moreover, it also important to the network and operator to differentiate the RLF due to T312 expiry and due to T310 expiry in the network so that corrective configurations can be made. The corrective actions for T310 expiry and T312 expiry will be different from network perspective. Therefore, it is important that the network identifies these failures differently and hence would require the UE (100) to indicate them distinctly to the network. Therefore, on an event of SCG failure (PScell RLF), the UE (100) should be provisioned to indicate RLF cause value indicating T312 expiry as illustrated below:

SCG Failure Due to T312 Expiry for EN-DC and NGEN-DC:

5.7.3.3 Failure type determination for (NG)EN-DC

The UE shall set the SCG failure type as follows:

1> if the UE initiates transmission of the SCGFailureInformationNR message due to T310 expiry:
2> set the failureType as t310-Expiry;
1> else if the UE initiates transmission of the SCGFailureInformationNR message due to T312 expiry:
2> set the failureType as t312-Expiry;
1> else if the UE initiates transmission of the SCGFailureInformationNR message to provide reconfiguration with sync failure information for an SCG:
2> set the failureType as synchReconfigFailure-SCG;
1> else if the UE initiates transmission of the SCGFailureInformationNR message to provide random access problem indication from SCG MAC:
2> set the failureType as randomAccessProblem;
1> else if the UE initiates transmission of the SCGFailureInformationNR message to provide indication from SCG RLC that the maximum number of retransmissions has been reached:
2> set the failureType as rlc-MaxNumRetx;
1> else if the UE initiates transmission of the SCGFailureInformationNR message due to SRB3 IP check failure:
2> set the failureType as srb3-IntegrityFailure;
1> else if the UE initiates transmission of the SCGFailureInformationNR message due to Reconfiguration failure of NR RRC reconfiguration message:
2> set the failureType as scg-reconfigFailure.

```
SCGFailureInformationNR-r15 ::=           SEQUENCE {
    criticalExtensions                    CHOICE {
        c1                                CHOICE {
            scgFailureInformationNR-r15       SCGFailureInformationNR-r15-
IEs,
            spare3 NULL, spare2 NULL, spare1 NULL
        },
        criticalExtensionsFuture          SEQUENCE { }
    }
}
SCGFailureInformationNR-r15-IEs ::=       SEQUENCE {
    failureReportSCG-NR-r15                   FailureReportSCG-NR-r15
    OPTIONAL,
    nonCriticalExtension                  SEQUENCE { }
        OPTIONAL
}
FailureReportSCG-NR-r15 ::=               SEQUENCE {
    failureType-r15                           ENUMERATED {
                                                  t310-Expiry,
    randomAccessProblem,                          rlc-
    MaxNumRetx,                                   scg-
    ChangeFailure, scg-reconfigFailure,           srb3-
    IntegrityFailure, t312-Expiry},
```

-continued

```
    measResultFreqListNR-r15              MeasResultFreqListFailNR-r15
        OPTIONAL,
    measResultSCG-r15                     OCTET STRING
        OPTIONAL,
    ...
}
```

The SCG failure due to T312 expiry for NE-DC: The use of T314 is only for illustration. It may either be T314/T315/T312 etc., 5.6.13.x Transfer of SCG Failure Information for NE-DC
The UE shall:
*1051> if SCG failure is due to T313 expiry:
2> consider the failureType to be t313-Expiry;
1> else if SCG failure is due to T314 expiry:
2> consider the failureType to be t314-Expiry;
1> else if SCG failure is due to indication from SCG MAC that a random access problem was detected:
2> consider the failureType to be randomAccessProblem;
1> else if SCG failure is due to indication from SCG RLC that the maximum number of retransmissions was reached:
2> consider the failureType to be rlc-MaxNumRetx;
1> else if SCG failure is due to SCG change failure:
2> consider the failureType to be scg-ChangeFailure;
1> else if SCG failure is due to exceeding maximum uplink transmission timing difference:
2> include failureType and set it to maxUL-TimingDiff;
1> set the contents of the MeasResultSCG-FailureMRDC as follows:

2> for each measObjectEUTRA for which a measId is configured and for which measurement results are available;
3> include an entry in measResultsFreqListEUTRA;
3> if a serving cell is associated with the MeasObjectEUTRA:
4> set measResultServingCell to include the available quantities of the concerned cell and in accordance with the performance requirements in TS 36.133 [16];
3> set the measResultNeighCellList to include the best measured cells, ordered such that the best cell is listed first, and based on measurements collected up to the moment the UE detected the failure, including for each cell the optional fields for which measurement results are available;
1> initiate transfer for SCG failure information i.e. of failureType and MeasResultSCG-FailureMRDC via NR MCG embedded in an NR RRC SCGFailureInformationEUTRA message as specified in TS 38.331 [X, 5.7.x]

```
SCGFailureInformation ::=               SEQUENCE {
    criticalExtensions                      CHOICE {
        scgFailureInformation                   SCGFailureInformation-IEs,
        criticalExtensionsFuture                SEQUENCE { }
    }
}
SCGFailureInformation-IEs ::=           SEQUENCE {
    failureReportSCG                            FailureReportSCG
        OPTIONAL,
    nonCriticalExtension                        SEQUENCE { }
        OPTIONAL
}
FailureReportSCG ::=                    SEQUENCE {
    failureType                                 ENUMERATED {
                                                    t310-Expiry,
    randomAccessProblem,                        rlc-
    MaxNumRetx,
        synchReconfigFailure-SCG, scg-reconfigFailure,
                                                    srb3-
    IntegrityFailure, t312-Expiry},
    measResultFreqList                          MeasResultFreqListFail
        OPTIONAL,
    measResultSCG-Failure                       OCTET STRING
        OPTIONAL,
    ...
}
```

SCG failure due to T312 expiry for NR-DC:

```
SCGFailureInformationEUTRA ::=      SEQUENCE {
    criticalExtensions                  CHOICE {
        scgFailureInformationEUTRA          SCGFailureInformationEUTRA-IEs,
        criticalExtensionsFuture            SEQUENCE { }
    }
}
SCGFailureInformationEUTRA-IEs ::= SEQUENCE {
    failureReportSCG-EUTRA                  FailureReportSCG-EUTRA
        OPTIONAL,
```

| | |
|---|---|
| nonCriticalExtension OPTIONAL | SEQUENCE { } |
| }<br>FailureReportSCG-EUTRA ::=<br>    failureType | SEQUENCE {<br>    ENUMERATED {<br>        t313-Expiry, randomAccessProblem,<br>        rlc-MaxNumRetx, scg-ChangeFailure,<br>        maxUL-TimingDiff, t312-Expiry}, |
|     measResultFreqListMRDC | MeasResultFreqListFailMRDC   OPTIONAL, |
|     measResultSCG-FailureMRDC<br>    ...<br>} | OCTET STRING   OPTIONAL, |

5.7.3.3 a Failure type determination for NR-DC
The UE shall set the SCG failure type as follows:
1> if the UE initiates transmission of the SCGFailureInformationNR message due to T310 expiry:
   2> set the failureType as t310-Expiry;
1> else if the UE initiates transmission of the SCGFailureInformationNR message due to T312 expiry:
   2> set the failureType as t312-Expiry;
1> else if the UE initiates transmission of the SCGFailureInformationNR message to provide reconfiguration with sync failure information for an SCG:
   2> set the failureType as synchReconfigFailure-SCG;
1> else if the UE initiates transmission of the SCGFailureInformationNR message to provide random access problem indication from SCG MAC:
   2> set the failureType as randomAccessProblem;
1> else if the UE initiates transmission of the SCGFailureInformationNR message to provide indication from SCG RLC that the maximum number of retransmissions has been reached:
   2> set the failureType as rlc-MaxNumRetx;
1> else if the UE initiates transmission of the SCGFailureInformationNR message due to SRB3 IP check failure:
   2> set the failureType as srb3-IntegrityFailure;
1> else if the UE initiates transmission of the SCGFailureInformationNR message due to Reconfiguration failure of NR RRC reconfiguration message:
   2> set the failureType as scg-reconfigFailure.

In an embodiment, the method can be used to handle the timer T312 in NR standalone operation (3GPP TS 38.331). In NR standalone scenario, the network can configure T312 in one of the following processes illustrated earlier:
1. As a measurement object specific configuration within the measurement configuration from the gNB, or
2. As a UE specific configuration within RRCReconfiguration using RLF-Timers And Constants in spCellConfig If the T312 is configured for the UE (100), and measurement report is triggered when T310 is running for a measurement object and reporting configuration that are configured with T312, timer T312 is started as illustrated below.

5.4 Measurement Report Triggering
5.5.4.1 General
If security has been activated successfully, the UE shall:
1> for each measId included in the measIdList within VarMeasConfig:
. . .
   2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
      3> include a measurement reporting entry within the VarMeasReportList for this measId;
      3> set the numberOfReportsSent defined within the VarMeasReportList for this measId to 0;
      3> include the concerned cell(s) in the cellsTriggeredList defined within the VarMeasReportList for this measId;
      3> if the UE supports T312 and if useT312 is included for this event and if T310 is running:
         4> if T312 is not running:
            5> start timer T312 with the value configured in the corresponding measObject;
      3> initiate the measurement reporting procedure, as specified in 5.5.5;
   2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
      3> set the numberOfReportsSent defined within the VarMeasReportList for this measId to 0;
      3> include the concerned cell(s) in the cellsTriggeredList defined within the VarMeasReportList for this measId;
      3> if the UE supports T312 and if useT312 is included for this event and if T310 is running:
         4> if T312 is not running:
            5> start timer T312 with the value configured in the corresponding measObject;
      3> initiate the measurement reporting procedure, as specified in 5.5.5;

In an embodiment, the timer T312 is stopped when handover command or reconfiguration with sync message is received from the network, or when the UE (100) initiates re-establishment message or when the UE (100) recovers from lower layer problems as illustrated below:

5.3.5.5.2 Reconfiguration with Sync
The UE shall perform the following actions to execute a reconfiguration with sync.
1> if the security is not activated, perform the actions upon going to RRC_IDLE as specified in 5.3.11 with the release cause 'other' upon which the procedure ends;
1> stop timer T310 for the corresponding SpCell, if running;
1> if reconfigurationWithSync is received for PCell
   2> stop timer T312 for the Pcell, if running;

1> start timer T304 for the corresponding SpCell with the timer value set to t304, as included in the reconfigurationWithSync;
. . .
or 5.3.5.5.2 Reconfiguration with sync
The UE shall perform the following actions to execute a reconfiguration with sync.
1> if the security is not activated, perform the actions upon going to RRC_IDLE as specified in 5.3.11 with the release cause 'other' upon which the procedure ends;
1> stop timer T310 for the corresponding SpCell, if running;
1> stop timer T312 for the corresponding SpCell, if running;
1> start timer T304 for the corresponding SpCell with the timer value set to t304, as included in the reconfigurationWithSync;
. . .

5.3.7 RRC connection re-establishment
5.3.7.2 Initiation
The UE initiates the procedure when one of the following conditions is met:
1> upon detecting radio link failure of the MCG, in accordance with 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with sub-clause 5.3.5.8.2.
Upon initiation of the procedure, the UE shall:
1> stop timer T310, if running;
1> stop timer T312, if running;
1> stop timer T304, if running;
. . .
5.3.10.2 Recovery of physical layer problems
Upon receiving N311 consecutive "in-sync" indications for the SpCell from lower layers while T310 is running, the UE shall:
1> stop timer T310 for the corresponding SpCell.
1> stop tinier T312 for the PCell, if running, when N311 consecutive "in-sync" indications is received on PCell
or
5.3.10.2 Recovery of physical layer problems
Upon receiving N311 consecutive "in-sync" indications for the SpCell from lower layers while T310 is running, the UE shall:
1> stop timer T310 for the corresponding SpCell;
1> stop timer T312 for the corresponding SpCell.
When T312 expires, the UE (100) declares radio link failure (RLF) and initiates radio link failure recovery using re-establishment procedure as illustrated below:
5.3.10.3 Detection of radio link failure
The UE shall:
1> upon T310 expiry in PCell; or
1> upon T312 expiry in PCell, or
1> upon random access problem indication from MCG MAC while neither T300, T301, T304, T311 nor T319 are running; or
1> upon indication from MCG RLC that the maximum number of retransmissions has been reached:

2> if CA duplication is configured and activated; and for the corresponding logical channel allowedServingCells only includes SCell(s):
3> initiate the failure information procedure as specified in 5.7.5 to report RLC failure.
2> else:
3> consider radio link failure to be detected for the MCG i.e. RLF;
3> if AS security has not been activated:
4> perform the actions upon going to RRC_IDLE as specified in 5.3.11, with release cause 'other';
3> else if AS security has been activated but SRB2 and at least one DRB have not been setup:
4> perform the actions upon going to RRC_IDLE as specified in 5.3.11, with release cause 'RRC connection failure';
3> else:
4> initiate the connection re-establishment procedure as specified in 5.3.7.

In an embodiment, the method can be used to handle the T312 in (NG) EN-DC operation. Handling of T312 on LTE PCell/MCG in (NG) EN-DC operation (3GPP TS 36.331), In (NG) EN-DC configuration or when the UE (100) is configured to operate in (NG) EN-DC, configuration of T312 may be provided based on the existing signaling mechanisms provisioned in the LTE specifications (as part of measurement configuration). The configuration and value of T312 is provided as part of measurement object configuration and the application of T312 is provided as part of reporting configuration. The LTE (3GPP TS 36.331) already supports T312 based early RLF declaration or fast handover recovery mechanism on PCell. If T312 is configured for the UE (100) on the MCG, and measurement report is triggered when T310 is running for the measurement object and reporting configuration that are configured with T312, timer T312 is started as illustrated below:

5.5.4 Measurement Report Triggering
5.5.4.1 General
If security has been activated successfully, the UE shall:
1> for each measId included in the measIdList within VarMeasConfig
. . .
2> if the triggerType is set to event, and if the corresponding reportConfig does not include numberOfTriggeringCells, and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
3> include a measurement reporting entry within the VarMeasReportList for this measId;
3> set the numberOfReportsSent defined within the VarMeasReportList for this measId to 0;
3> include the concerned cell(s) in the cellsTriggeredList defined within the VarMeasReportList for this measId;
3> if the UE supports T312 and if useT312 is included for this event and if T310 is running:
4> if T312 is not running:
5> start timer T312 with the value configured in the corresponding measObject;
3> initiate the measurement reporting procedure, as specified in 5.5.5;

2> if the triggerType is set to event, and if the corresponding reportConfig does not include numberOfTriggeringCells, and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
   3> set the numberOfReportsSent defined within the VarMeasReportList for this measId to 0;
   3> include the concerned cell(s) in the cellsTriggeredList defined within the VarMeasReportList for this measId;
   3> if the UE supports T312 and if useT312 is included for this event and if T310 is running:
     4> if T312 is not running:
       5> start timer T312 with the value configured in the corresponding measObject;
   3> initiate the measurement reporting procedure, as specified in 5.5.5;

Timer T312 is stopped when handover command from the network, or when UE (100) initiates re-establishment message or when the UE (100) recovers from lower layer problems as illustrated below:

5.3.5.4 Reception of an RRCConnectionReconfiguration including the mobilityControlInfo by the UE (handover)

If the RRCConnectionReconfiguration message includes the mobilityControlInfo and the UE is able to comply with the configuration included in this message, the UE shall:
1> stop timer T310, if running;
1> stop timer T312, if running;
. . .

5.3.7 RRC connection re-establishment
5.3.7.2 Initiation

The UE shall only initiate the procedure either when AS security has been activated or for a NB-IoT UE supporting RRC connection re-establishment for the Control Plane CIoT EPS optimisation. The UE initiates the procedure when one of the following conditions is met:
1> upon detecting radio link failure, in accordance with 5.3.11; or
1> upon handover failure, in accordance with 5.3.5.6; or
1> upon mobility from E-UTRA failure, in accordance with 5.4.3.5; or
1> upon integrity check failure indication from lower layers concerning SRB1 or SRB2; or
1> upon an RRC connection reconfiguration failure, in accordance with 5.3.5.5; or
1> upon an RRC connection reconfiguration failure, in accordance with TS38.331 [82, 5.3.5.5].

Upon initiation of the procedure, the UE shall:
1> stop timer T310, if running;
1> stop timer T312, if running;
. . .

5.3.11.2 Recovery of physical layer problems

Upon receiving N311 consecutive "in-sync" indications for the PCell from lower layers while T310 is running, the UE shall:
1> stop timer T310;
1> stop timer T312, if running;
. . .

5.4.3.3 Reception of the MobilityFromEUTRACommand by the UE

The UE shall be able to receive a MobilityFromEUTRACommand message and perform a cell change order to GERAN, even if no prior UE measurements have been performed on the target cell.

The UE shall:
1> stop timer T310, if running;
1> stop timer T312, if running;

When T312 expires, UE declares radio link failure (RLF) and initiates radio link failure recovery using re-establishment procedure as illustrated below:

5.3.11.3 Detection of radio link failure

The UE shall:
1> upon T310 expiry; or
1> upon T312 expiry; or
1> upon random access problem indication from MCG MAC while neither T300, T301, T304 nor T311 is running; or
1> upon indication from MCG RLC, which is allowed to be send on PCell, that the maximum number of retransmissions has been reached for an SRB or DRB:

In an embodiment, the method can be used to handle the T312 on NR PScell/SCG in (NG) EN-DC operation (3GPP TS 38.331). The network (i.e., SN) can configure T312 to the UE (100) in (NG)EN-DC mode of operation, in one of the following methods either over SRB1 via MCG (container in MCG reconfiguration message) or over SRB3 directly to the UE (100):

As a measurement object specific configuration within the measurement configuration from gNB, or As a UE specific configuration within RRCReconfiguration using RLF-Timers and Constants in spCellConfig.

If T312 is configured for the UE (100), and measurement report is triggered when T310 is running for the measurement object and reporting configuration that are configured with T312, timer T312 is started as illustrated below.

5.5.4 Measurement report triggering
5.5.4.1 General

If security has been activated successfully, the UE
1> for each measId included in the measIdList within VarMeasConfig:
. . .
  2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
   3> include a measurement reporting entry within the VarMeasReportList for this measId;
   3> set the numberOfReportsSent defined within the VarMeasReportList for this measId to 0;
   3> include the concerned cell(s) in the cellsTriggeredList defined within the VarMeasReportList for this measId;
   3> if the UE supports T312 and if useT312 is included for this event and if T310 is running:
     4> if T312 is not running:
       5> start timer T312 with the value configured in the corresponding measObject;
   3> initiate the measurement reporting procedure, as specified in 5.5.5;
  2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
   3> set the numberOfReportsSent defined within the VarMeasReportList for this measId to 0;
   3> include the concerned cell(s) in the cellsTriggeredList defined within the VarMeasReportList for this measId;
   3> if the UE supports T312 and if useT312 is included for this event and if T310 is running:
      4> if T312 is not running:
         5> start timer T312 with the value configured in the corresponding measObject;
   3> initiate the measurement reporting procedure, as specified in 5.5.5;

The timer T312 is stopped when handover command or reconfiguration with sync message is received from the network, or when the UE (100) initiates re-establishment message or when the UE (100) recovers from lower layer problems as illustrated below:

5.3.5.5.2 Reconfiguration with sync
The UE shall perform the following actions to execute a reconfiguration with sync.
   1> if the security is not activated, perform the actions upon going to RRC_IDLE as specified in 5.3.11 with the release cause 'other' upon which the procedure ends;
   1> stop timer T310 for the corresponding SpCell, if running;
   1> if reconfigurationWithSync is received for PSCell
   2> stop timer T312 for the PScell, if running;
   1> start timer T304 for the corresponding SpCell with the timer value set to t304, as included in the reconfigurationWithSync;
. . .
or
5.3.5.5.2 Reconfiguration with sync
The UE shall perform the following actions to execute a reconfiguration with sync.
   1> if the security is not activated, perform the actions upon going to RRC_IDLE as specified in 5.3.11 with the release cause 'other' upon which the procedure ends;
   1> stop timer T310 for the corresponding SpCell, if running;
   1> stop timer T312 for the corresponding SpCell, if running;
   1> start timer T304 for the corresponding SpCell with the timer value set to t304, as included in the reconfigurationWithSync;
. . .
5.3.7 RRC connection re-establishment
5.3.7.2 Initiation
The UE initiates the procedure when one of the following conditions is met:
   1> upon detecting radio link failure of the MCG, in accordance with 5.3.10; or
   1> upon re-configuration with sync failure of the MCG, in accordance with sub-clause 5.3.5.8.3; or
   1> upon mobility from NR failure, in accordance with sub-clause 5.4.3.5; or
   1> upon integrity check failure indication from lower layers concerning SRB1 or SRB2, except if the integrity check failure is detected on the RRCReestablishment message; or
   1> upon an RRC connection reconfiguration failure, in accordance with sub-clause 5.3.5.8.2.

Upon initiation of the procedure, the UE shall:
   1> stop timer T310, if running;
   1> stop timer T312, if running;
   1> stop timer T304, if running;
. . .
5.3.10.2 Recovery of physical layer problems
Upon receiving N311 consecutive "in-sync" indications for the SpCell from lower layers while T310 is running, the UE shall:
   1> stop tinier T310 for the corresponding SpCell;
   1> stop tinier T312 for the PSCell, if running, when N311 consecutive "in-sync" indications is received on PSCell
or
5.3.10.2 Recovery of physical layer problems
Upon receiving N311 consecutive "in-sync" indications for the SpCell from lower layers while T310 is running, the UE shall:
   1> stop timer T310 for the corresponding SpCell;
   1> stop timer T312 for the corresponding SpCell.
5.3.5.4 Secondary cell group release
The UE shall:
   1> as a result of SCG release triggered by E-UTRA:
      2> reset SCG MAC, if configured;
      2> for each RLC bearer that is part of the SCG configuration:
         3> perform RLC bearer release procedure as specified in 5.3.5.5.3;
      2> release the SCG configuration;
      2> stop timer T310 for the corresponding SpCell, if running;
      2> stop timer T312 for the corresponding SpCell, if running;
      2> stop timer T304 for the corresponding SpCell, if running.

When T312 expires, the UE (100) declares SCG radio link failure or SCG failure and initiates recovery using SCG failure information procedure as illustrated below:
5.3.10.3 Detection of Radio Link Failure
The UE shall:
. . .
The UE shall:
   1> upon T310 expiry in PSCell; or
   1> upon T312 expiry in PSCell; or
   1> upon random access problem indication from SCG MAC; or
   1> upon indication from SCG RLC that the maximum number of retransmissions has been reached:
      2> if CA duplication is configured and activated; and for the corresponding logical channel allowedServingCells only includes SCell(s):
         3> initiate the failure information procedure as specified in 5.7.5 to report RLC failure.
      2> else:
         3> consider radio link failure to be detected for the SCG i.e. SCG-RLF;
         3> initiate the SCG failure information procedure as specified in 5.7.3 to report SCG radio link failure.

In an embodiment, the method can be used to handle the T312 in the NE-DC operations. The method can be used to handle T312 on NR MCG/PCell in NE-DC operations (3GPP TS 38.331). The handling of the T312 and operations based on T312 states on the NR MCG or PCell in NE-DC operation is similar to that of NR standalone operation as illustrated in earlier section. The same operations and procedure for measurement report triggering, start, stop and expiry of T312 is applicable here.

Method of handling T312 on LTE SCG/PSCell in NE-DC operation (3GPP TS 36.331), LTE (3GPP TS 36.331) already supports T312 based early RLF declaration or fast handover recovery mechanism on PCell. However, in NE-DC configuration or when a UE is configured to operate in NE-DC, LTE cell is configured as PSCell or SCG. The fast handover recovery or early RLF declaration on LTE as a PSCell may be handled either by use of T312 or using T314 or T315. In LTE, there is already T312 defined in specification 3GPP TS 36.306 and 36.331 for handling of early RLF declaration or fast handover recovery mechanism. However, this is a feature from old release and reusing the same for SCG recovery may lead to backward compatibility issues. Therefore, a new timer say T314 or T315 has to be introduced in LTE to indicate the support of early SCG RLF declaration and fast SCG handover recovery. Otherwise, T312 may be commonly used to control early RLF declaration on both MCG and SCG. In such cases, a new UE capability for indicating support of T312 on SCG need to be sent to the network to make network aware that UE supports T312 operation on SCG as well. The following example using T312 is only an illustration and the timer name can be different (e.g., T314 or T315). The configuration of T312 for PSCell shall be provided as part of measurement configuration. The configuration and value of T312 is provided as part of measurement object configuration and the application of T312 is provided as part of reporting configuration. If T312 is configured for the UE on SCG, and measurement report is triggered when T310 is running for a measurement object and reporting configuration that are configured with T312, timer T312 is started as illustrated below.

5.5.4 Measurement report triggering
5.5.4.1 General
If security has been activated successfully, the UE
1> for each measId included in the measIdList within VarMeasConfig
. . .
2> if the triggerType is set to event, and if the corresponding reportConfig does not include numberOfTriggeringCells, and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
3> include a measurement reporting entry within the VarMeasReportList for this measId;
3> set the numberOfReportsSent defined within the VarMeasReportList for this measId to 0;
3> include the concerned cell(s) in the cellsTriggeredList defined within the VarMeasReportList for this measId;
3> if the UE supports T312 and if useT312 is included for this event and if T310 is running:
4> if T312 is not running:
5> start timer T312 with the value configured in the corresponding measObject;
3> initiate the measurement reporting procedure, as specified in 5.5.5;

2> if the triggerType is set to event, and if the corresponding reportConfig does not include numberOfTriggeringCells, and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
3> set the numberOfReportsSent defined within the VarMeasReportList for this measId to 0;
3> include the concerned cell(s) in the cellsTriggeredList defined within the VarMeasReportList for this measId;
3> if the UE supports T312 and if useT312 is included for this event and if T310 is running:
4> if T312 is not running:
5> start timer T312 with the value configured in the corresponding measObject;
3> initiate the measurement reporting procedure, as specified in 5.5.5;

Timer T312 is stopped when handover command from the network, or when UE initiates re-establishment message or when UE recovers from lower layer problems as illustrated below:

5.3.5.4 Reception of an RRCConnectionReconfiguration including the mobilityControlInfo by the UE (handover)
If the RRCConnectionReconfiguration message includes the mobilityControlInfo and the UE is able to comply with the configuration included in this message, the UE shall:
1> stop timer T310, if running;
1> stop timer T312, if running;
. . .
5.3.7 RRC connection re-establishment
5.3.7.2 Initiation
The UE shall only initiate the procedure either when AS security has been activated or for a NB-IoT UE supporting RRC connection re-establishment for the Control Plane CIoT EPS optimisation. The UE initiates the procedure when one of the following conditions is met:
1> upon detecting radio link failure, in accordance with 5.3.11; or
1> upon handover failure, in accordance with 5.3.5.6; or
1> upon mobility from E-UTRA failure, in accordance with 5.4.3.5; or
1> upon integrity check failure indication from lower layers concerning SRB1 or SRB2; or
1> upon an RRC connection reconfiguration failure, in accordance with 5.3.5.5; or
1> upon an RRC connection reconfiguration failure, in accordance with T538.331 [82, 5.3.5.5].
Upon initiation of the procedure, the UE shall:
1> stop timer T310, if running;
1> stop timer T312 on PCell, if running;
1> stop timer T313, if running;
1> stop timer T312 on PSCell, if running;
. . .
5.3.11.2 Recovery of physical layer problems
Upon receiving N311 consecutive "in-sync" indications for the PCell from lower layers while T310 is running, the UE shall:
1> stop timer T310;
1> stop timer T312 for PCell, if running;

1> stop timer T310;
1> stop timer T312 for PSCell, if running;
. . .
5.4.3.3 Reception of the MobilityFromEUTRACommand by the UE The UE (100) shall be able to receive a Mobility-FromEUTRACommand message and perform a cell change order to GERAN, even if no prior UE measurements have been performed on the target cell.

The UE shall:
1> stop timer T310, if running;
1> stop timer T312, if running;
5.3.10.10 SCG reconfiguration
The UE shall:
1> if makeBeforeBreakSCG is configured:
2> stop timer T313, if running;
2> stop timer T312, if running;

| T312 | Upon triggering a measurement report on SpCell, for a measurement identity for which T312 has been configured, while T310 is running on that SpCell | Upon receiving N311 consecutive in-sync indications from lower layers for the SpCell, upon receiving RRCR econfiguration with reconfigurationWithSync for that cell group, upon initiating the connection re-establishment procedure, and upon the expiry of T310. Upon SCG release, if the T312 is kept in SCG | If T312 is kept in MCG: If security is not activated: go to RRC_IDLE else: initiate the connection re-establishment procedure If the T310 is kept in SCG, Inform E-UTRAN/NR about the SCG radio link failure by initiating the SCG failure information procedure as specified in 5.7.3. |

When T312 expires, UE declares SCG radio link failure or SCG failure and initiates recovery using SCG failure information procedure as illustrated below:

5.3.11.3 Detection of Radio Link Failure
. . .
In case of DC, the UE shall:
1> upon T313 expiry; or
1> upon T312 expiry on PSCell;
1> upon random access problem indication from SCG MAC; or
1> upon indication from SCG RLC, which is allowed to be sent on PSCell, that the maximum number of retransmissions has been reached for an SCG or split DRB:
2> consider radio link failure to be detected for the SCG i.e. SCG-RLF;
2> initiate the ure information procedure as specified in 5.6.13 to report SCG radio link failure;
In case of CA PDCP duplication, the UE shall:
1> upon indication from an RLC entity, which is restricted to be sent on SCell only, that the maximum number of retransmissions has been reached:
2> consider radio link failure to be detected for the RLC entity;
2> initiate the failure information procedure as specified in 5.6.21 to report PDCP duplication failure;
The UE may discard the radio link failure information, i.e. release the UE variable VarRLF-Report, 48 hours after the radio link failure is detected, upon power off or upon detach.

| T314 | Upon triggering a measurement report on PSCell, for a measurement identity for which T314 has been configured, while T313 is running on that PSCell | Upon receiving N313 consecutive in-sync indications from lower layers for the PSCell, upon receiving handover command for that cell group, upon initiating the connection re-establishment procedure, and upon the expiry of T313. Upon SCG release or NE-DC release, | Inform E-UTRAN/NR about the SCG radio link failure by initiating the SCG failure information procedure as specified in 5.7.3. |

In an embodiment, NR-DC, procedural text from TS 38.331 for NR SA is applicable for NR MCG, procedural text from TS 38.331 for NR SCG is applicable. In an embodiment, Method of handling T312 in NR-DC operations, Method of handling T312 on NR MCG/PCell in NR-DC operations (3GPP TS 38.331), Handling of T312 and operations based on T312 state on NR MCG or PCell in NR-DC operation is similar to that of NR standalone operation as illustrated in earlier section. The same operations and procedure for measurement report triggering, start, stop and expiry of T312 is applicable here.

| T312 | Upon triggering a measurement report on SpCell, for a measurement identity for which T312 has been configured, while T310 is running on that SpCell | Upon receiving N311 consecutive in-sync indications from lower layers for the SpCell, upon receiving RRCReconfiguration with reconfigurationWithSync for that cell group, upon initiating the connection re-establishment procedure, and upon the expiry of T310. Upon SCG release, if the T312 is kept in SCG | If T312 is kept in MCG: If security is not activated: go to RRC_IDLE else: initiate the connection re-establishment procedure If the T310 is kept in SCG, Inform E-UTRAN/NR about the SCG radio link failure by initiating the SCG failure information procedure as specified in 5.7.3. |
|---|---|---|---|

In an embodiment, Method of handling T312 on NR SCG/PSCell in NE-DC operations (3GPP TS 38.331), Handling of T312 and operations based on T312 state on NR SCG or PSCell in NR-DC operation is similar to the handling of T312 on NR SCG when operating in (NG) EN-DC operation as illustrated in earlier section. The same operations and procedure for measurement report triggering, start, stop and expiry of T312 is applicable here.

In an example, at S202b, the SN (300) sends the measurement configuration to the UE (100). At S204b, the data from SN bearers is established between the UE (100) and the SN (300). At S206b, the SN (300) sends the RRC reconfiguration to the UE (100). At S208b, the UE (100) detects the Qout for the PSCell. At S210a, the UE (100) starts the timer (i.e., T310) for the PScell. At S212a, the UE (100) sends the measurement report to the SN (300) over the SRB3 message. At S214b, the UE (100) starts the second timer (i.e., T312), the second timer is expired and the first timer is stopped. At S216b, the UE (100) initiates the SCG failure procedure. At S218b, the UE (100) shares the SCG failure information to the MeNB (200). At S220b, the MeNB (200) initiates the SCG failure recovery actions.

Figure 3A:
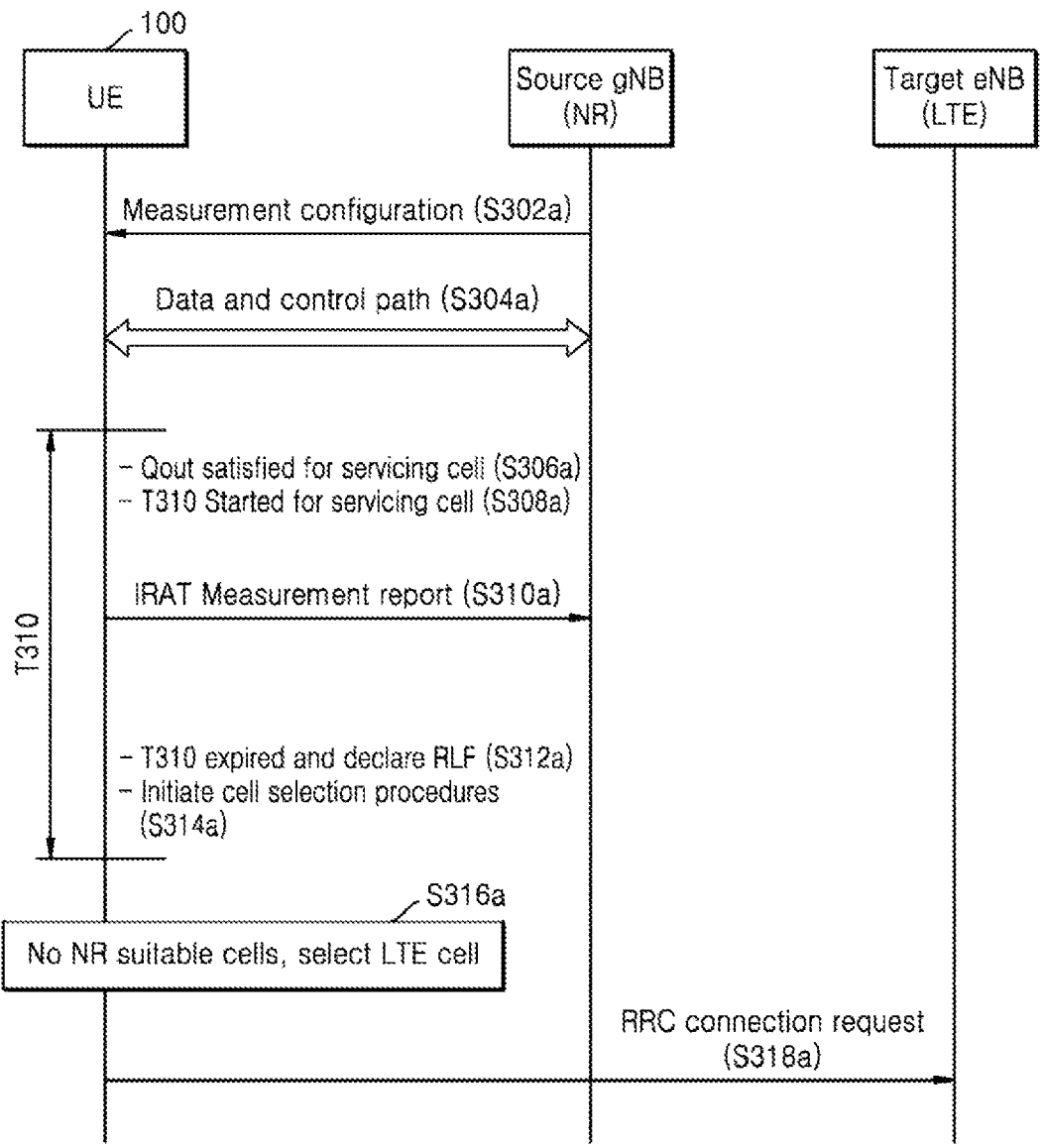
FIG. 3A is a flow diagram illustrating step by step operations for attempting cell selection on LTE (or the next priority RAT) On T310 expiry, according to an embodiment as disclosed herein.

FIG. 3A is a flow diagram illustrating a method for attempting cell selection on LTE (or the next priority RAT) On T310 expiry, according to an embodiment as disclosed herein.

In an embodiment, method can be used to detect the RLF using the T312, for IRAT measurement reporting. The methods explained earlier are related to early SCG failure detection and indication in dual connectivity scenario. This feature is useful also in a single connectivity scenario as well. Currently, T312 based early RLF detection is primarily used in intra-RAT coverage boundaries. With the introduction of NR technology, existing LTE networks are expected to be upgraded in order to support NR operation. However, NR service is not available at every location. Early deployments of integrating NR over existing LTE networks is to provide NR services in selected areas. The deployments are as hotspots for providing improved broadband service to the subscriber while maintaining the existing LTE RF footprint for providing coverage once the UE moves away from these NR available regions. Therefore, the NR coverage is expected to be sparse. As a result, there arise a case where a UE in connected state in NR is unable to sustain the channel and there are no NR neighbor cells available. UE eventually satisfies Qout criteria and T310 is started. On T310 expiry, the UE will attempt recovery on NR first, failure of which would result in attempting cell selection on LTE (or the next priority RAT) as illustrated in FIG. 3A.

In an example, at S302a, the UE (100) acquires the measurement configuration from the source gNB (i.e., NR). At 304a, data and control path is established between the UE (100) and the source gNB (i.e., NR). At 306a, the UE (100) determines that Qout is satisfied for servicing cell. At S308a, the first timer (i.e., T310) is started for the servicing cell. At S310a, the UE (100) sends the IRAT measurement report to the source gNB (i.e., NR). At S312a, the T310 is expired and UE (100) declares the RLF. At S314a, the UE (100) initiates the cell selection procedures. At S316a, the UE (100) does not select the NR suitable cells and selects the LTE cell. At S318a, the UE (100) sends the RRC connection request to the target eNB (i.e., LTE).

Figure 3B:
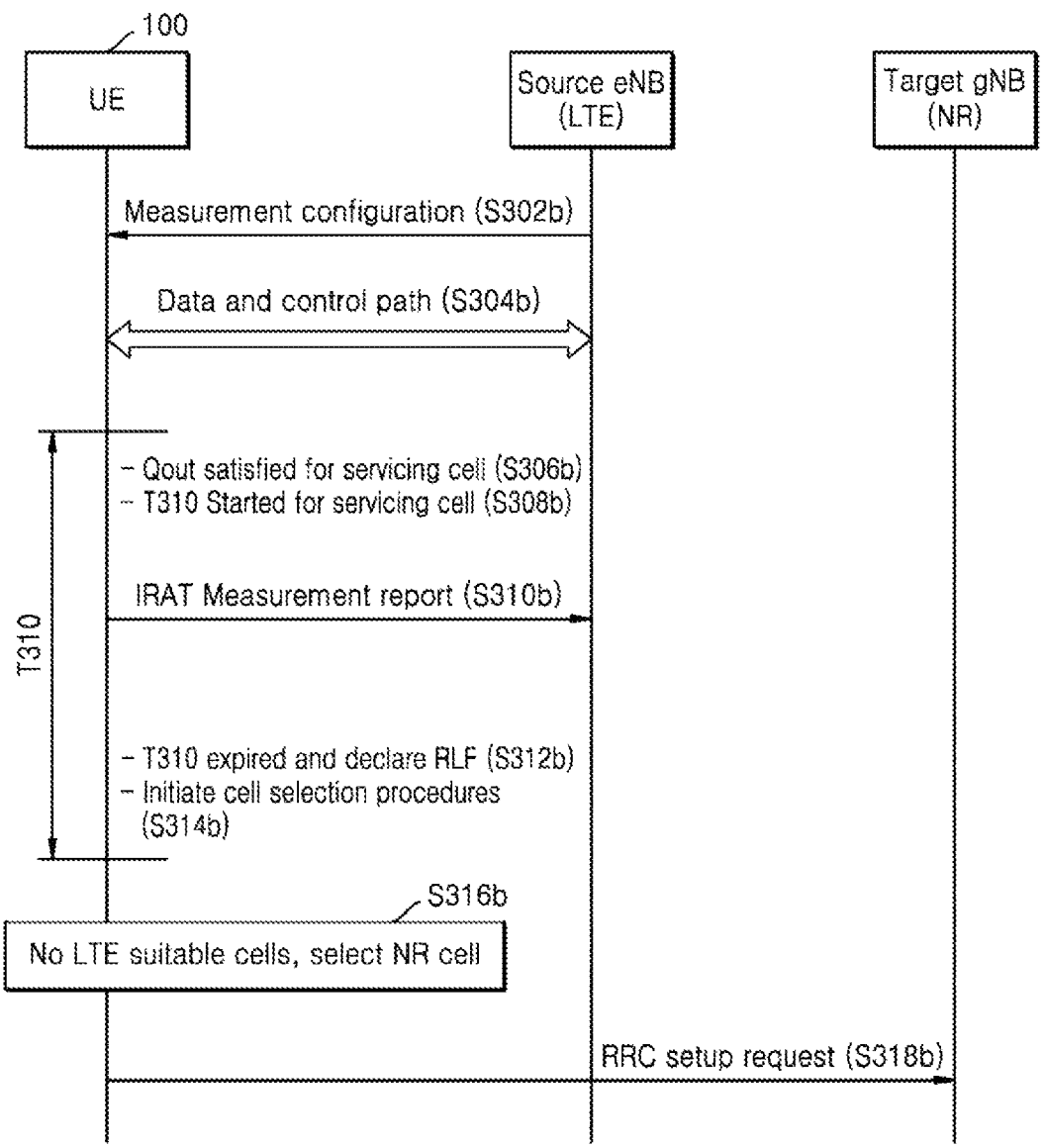
FIG. 3B is a flow diagram illustrating step by step operations for the mobility from NR or handover to LTE command from the network may not be received eventually leading to RLF due to T310 expiry, according to an embodiment as disclosed herein.

FIG. 3B is a flow diagram illustrating a method for the mobility from NR or handover to LTE command from the network may not be received eventually leading to RLF due to T310 expiry, according to an embodiment as disclosed herein.

In such a scenario where only LTE neighbor cells are available and the UE has triggered an IRAT measurement report for LTE neighbor cells, the UE is aware that an LTE cell suitable of handling service is available in vicinity. However, since the UE is in out of sync state, the mobility from NR or handover to LTE command from the network may not be received eventually leading to RLF due to T310 expiry. If T312 is configured for IRAT measurement objects, the UE would start T312 once the IRAT reporting criteria is satisfied and measurement report is sent to the network. On expiry of T312, UE would declare early RLF and attempt for faster recovery on the LTE cell. This recovery may be by attempting LTE cell search on RLF declaration using the knowledge that the UE has identified only LTE cells to be in its coverage. Otherwise, RLF recovery may first be attempted on NR and if no suitable cells are found, it may attempt on LTE cells. In such a scenario UE instead of performing RRC re-establishment on the LTE cell will attempt connection establishment by sending the RRC connection request message. T312 configuration in NR for IRAT may use a UE specific timer value configuration as part of SIB1 carrying ue-timersAndconstants or using measurement object specific configuration as illustrated below:

T312 configuration using ue-timersAndConstants in SIB1:

```
UE-TimersAndConstants ::=    SEQUENCE {
    t300                     ENUMERATED {ms100, ms200, ms300, ms400, ms600, ms1000,
ms1500, ms2000},
    t301                     ENUMERATED {ms100, ms200, ms300, ms400, ms600, ms1000,
ms1500, ms2000},
    t310                     ENUMERATED {ms0, ms50, ms100, ms200, ms500, ms1000,
ms2000},
    n310                     ENUMERATED {n1, n2, n3, n4, n6, n8, n10, n20},
    t311                     ENUMERATED {ms1000, ms3000, ms5000, ms10000, ms15000,
ms20000, ms30000},
    n311                     ENUMERATED {n1, n2, n3, n4, n5, n6, n8, n10},
    t319                     ENUMERATED {ms100, ms200, ms300, ms400, ms600, ms1000,
ms1500, ms2000},
    t312                     ENUMERATED {ms0, ms50, ms100,
ms200,ms300, ms400, ms500, ms1000},
    ...
}
```

T312 configuration in IRAT measurement object configuration on NR (MeasObjectEUTRA):

fore, it is required that T312 based early RLF detection is allowed for IRAT measurement reports as well. T312 configuration in LTE system shall be supported for IRAT NR measurement objects as illustrated below, IRAT NR reporting from EUTRAN serving cell:

```
MeasObjectEUTRA ::=          SEQUENCE {
    carrierFreq                  ARFCN-ValueEUTRA,
    allowedMeasBandwidth         AllowedMeasBandwidth,
    ...
    t312-Config-r16              SetupRelease { T312-Config )
    OPTIONAL    NEED N
    ...
}
T312-Config                  SEQUENCE {
    release                      NULL,
    setup                        ENUMERATED {ms0, ms50,
ms100, ms200,
                                     ms300, ms400, ms500,
ms1000}
}
``` or

```
MeasObjectEUTRA ::=          SEQUENCE {
    carrierFreq                  ARFCN-ValueEUTRA,
    allowedMeasBandwidth         AllowedMeasBandwidth,
    ...
    t312-r16                     ENUMERATED {ms0, ms50, ms100,
ms200, ms300, ms400, ms500, ms1000}
    OPTIONAL,  -- Need R
    ...
}
```

```
MeasObjectNR-r15 ::=         SEQUENCE {
    carrierFreq-r15              ARFCN-ValueNR-r15,
    rs-ConfigSSB-r15             RS-ConfigSSB-NR-r15,
    threshRS-Index-r15           ThresholdListNR-r15
                                 OPTIONAL,   -- Need OR
    ...
    t312-r16                     CHOICE {
        release                      NULL,
        setup                        ENUMERATED {ms0, ms50.
ms100, ms200,
                                         ms300, ms400,
ms500, ms1000}
    }
```

Going forward, NR is expected to be deployed with both operational frequencies deployed (FR1 i.e. below 6 GHz and FR2 i.e. above 6 GHz) in a heterogeneous deployment where there are plenty of small pico cells deployed on FR2 along with large macro cells on FR1. There can be locations where only NR coverage is available and LTE cells are not suitable. In future, the operators may migrate the LTE cells connected to EPC to eLTE cells which are capable to operate with 5GC (5G Core network, NR core network). The support of EPC may be discontinued in order for the operator to maintain a single core network. It is possible that NR coverage is available in areas where LTE coverage is not present. Also, the FR2 cells which are of small coverage and very high bandwidth will be densely deployed in order to provide NR services and improved mobile broadband to the users. It is possible that these small coverage cells are going to be in coverage of otherwise coverage holes. Therefore, it is possible that a UE operating on LTE might only have a neighbour NR cells which is suitable (in good signal conditions) and capable of providing service to the UE. There- -continued

```
    OPTIONAL,     -- Need ON
    ...
}
```

The UE (100) can be configured to apply T312 based configuration based on network configuring the application of T312 in reporting configuration IRAT measurements i.e. events B1 and B2. Different options of signalling the application. The application of T312 for a particular measurement report is based on the indication of T312 requirement for the configured reporting configuration. For EUTRA reporting configurations when connected to NR cell, T312 usage may be configured as a common IE which can be applied for any reporting configuration within the EventTriggerConfig as illustrated below:

```
EventTriggerConfigInterRAT ::=      SEQUENCE {
    eventId                         CHOICE {
        eventB1                         SEQUENCE {
            b1-ThresholdEUTRA                   MeasTriggerQuantityEUTRA,
            reportOnLeave                       BOOLEAN,
            hysteresis                          Hysteresis,
            timeToTrigger                       TimeToTrigger,
            ...
        },
        eventB2                         SEQUENCE {
            b2-Threshold1                       MeasTriggerQuantity,
            b2-Threshold2EUTRA                  MeasTriggerQuantityEUTRA,
            reportOnLeave                       BOOLEAN,
            hysteresis                          Hysteresis,
            timeToTrigger                       TimeToTrigger,
            ...
        },
        ...
    },
    rsType              NR-RS-Type,
    reportInterval              ReportInterval,
    reportAmount                ENUMERATED {r1, r2, r4, r8, r16, r32, r64, infinity},
    reportQuantity      MeasReportQuantity,
    maxReportCells              INTEGER (1..maxCellReport),
    useT312         BOOLEAN     OPTIONAL,           -- Need N
    ...
}
```

Alternatively, T312 usage can be signaled as a measurement event specific configuration within the EventTriggerConfig as illustrated below:

```
EventTriggerConfigInterRAT ::=      SEQUENCE {
    eventId                         CHOICE {
        eventB1                         SEQUENCE {
            b1-ThresholdEUTRA                   MeasTriggerQuantityEUTRA,
            reportOnLeave                       BOOLEAN,
            hysteresis                          Hysteresis,
            timeToTrigger                       TimeToTrigger,
                useT312
            BOOLEAN         OPTIONAL,           -- Need N
            ...
        },
        eventB2                         SEQUENCE {
            b2-Threshold1                       MeasTriggerQuantity,
            b2-Threshold2EUTRA                  MeasTriggerQuantityEUTRA,
            reportOnLeave                       BOOLEAN,
            hysteresis                          Hysteresis,
            timeToTrigger                       TimeToTrigger,
                useT312
            BOOLEAN         OPTIONAL,           -- Need N
            ...
        },
        ...
    },
    rsType              NR-RS-Type,
    reportInterval              ReportInterval,
    reportAmount                ENUMERATED {r1, r2, r4, r8, r16, r32, r64, infinity},
    reportQuantity      MeasReportQuantity,
    maxReportCells              INTEGER (1..maxCellReport),
    ...
}
```

Similarly, for reporting configuration of NR frequencies when connected to EUTRA, T312 usage may be configured as a common IE which can be applied for any reporting configuration within the ReportConfigInterRAT as illustrated below:

```
ReportCoaftgInterRAT ::=     SEQUENCE {
    triggerType                 CHOICE {
        event                       SEQUENCE {
            eventId                     CHOICE {
```

```
        eventB1                             SEQUENCE {
            b1-Threshold                    CHOICE {
                b1-ThresholdUTRA                ThresholdUTRA,
                b1-ThresholdGERAN               ThresholdGERAN,
                b1-ThresholdCDMA2000            ThresholdCDMA2000}
        },
        eventB2                             SEQUENCE {
            b2-Threshold1                   ThresholdEUTRA,
            b2-Threshold2                   CHOICE {
                b2-Threshold2UTRA               ThresholdUTRA,
                b2-Threshold2GERAN              ThreshoklGERAN,
                b2-Threshold2CDMA2000           ThresholdCDMA2000       }
        },
        ...,
        eventW1-r13                         SEQUENCE {
    w1-Threshold-r13    WLAN-RSSI-Range-r13
        },
        eventW2-r13                         SEQUENCE {
            w2-Threshold1-t13               WLAN-RSSI-Range-r13,
            w2-Threshold2-r13               WLAN-RSSI-Range-r13                },
        eventW3-r13                         SEQUENCE {
            w3-Threshold-r13                WLAN-RSSI-Range-r13
        },
        eventB1-NR-r15                          SEQUENCE {
            b1-ThresholdNR-r15                  ThresholdNR-r15,
            reportOnLeave-r15                   BOOLEAN                 },
        eventB2-NR-r15                          SEQUENCE {
            b2-Threshold1-r15                   ThresholdEUTRA,
            b2-Threshold2NR-r15                 ThresholdNR-r15,
            reportOnLeave-r15                   BOOLEAN     }           },
        hysteresis                                              Hysteresis,
        timeToTrigger                                           TimeToTrigger
    },
    periodical                                                  SEQUENCE {
        purpose                                             ENUMERATED   {
                                reportStrongestCells,
                                    reportStrongestCellsForSON,
                                reportCGI}
    }
},
maxReportCells                          INTEGER (1..maxCellReport),
reportInterval                          ReportInterval,
reportAmount                            ENUMERATED {r1, r2, r4, r8, r16, r32, r64, infinity},
...,
[[  si-RequestForHO-r9       ENUMERATED {setup} OPTIONAL           -- Cond reportCGI]],
[[  reportQuantityUTRA-FDD-r10    ENUMERATED {both} OPTIONAL             -- Need OR]],
[[  includeLocationInfo-r11          BOOLEAN            OPTIONAL    -- Need ON]],
[[  b2-Thresholdl-v1250                    CHOICE {
        release                                         NULL,
        setup                                           RSRQ-Range-v1250
    }
        OPTIONAL        -- Need ON
]],
[[  reportQuantityWLAN-r13    ReportQuantityWLAN-r13          OPTIONAL   -- Need ON]],
[[  reportAnyWLAN-r14     BOOLEAN                           OPTIONAL  -- Need ON]],
[[  reportQuantityCellNR-r15    ReportQuantityNR-r15         OPTIONAL, -- Need ON
        maxReportRS-Index-r15      INTEGER (0..maxRS-IndexReport-r15) OPTIONAL,
-- Need ON
        reportQuantityRS-IndexNR-r15    ReportQuantityNR-r15      OPTIONAL, -- Need ON
        reportRS-IndcxResultsNR        BOOLEAN         OPTIONAL,     -- Need ON
        reportSFTD-Mcas-r15   ENUMERATED {pSCell, neighborCells         }      OPTIONAL
-- Need ON
        useT312              BOOLEAN                          OPTIONAL,  -- Need ON
]]
```

At 302b, the UE (100) acquires the measurement configuration from the source gNB (i.e., LTE). At 304b, data and control path is established between the UE (100) and the source gNB (i.e., LTE). At 306b, the he UE (100) determines that Qout is satisfied for servicing cell. At 308b, the first timer (i.e., T310) is started for the servicing cell. At 310b, the UE (100) sends the IRAT measurement report to the source gNB (i.e., LTE). At 312b, the T310 is expired and UE (100) declares the RLF. At 314b, the UE (100) initiates the cell selection procedures. At 316b, the UE (100) does not select the LTE cells and selects the NR cell. At 318b, the UE (100) sends the RRC setup request to the target eNB (i.e., NR).

Figure 4A:
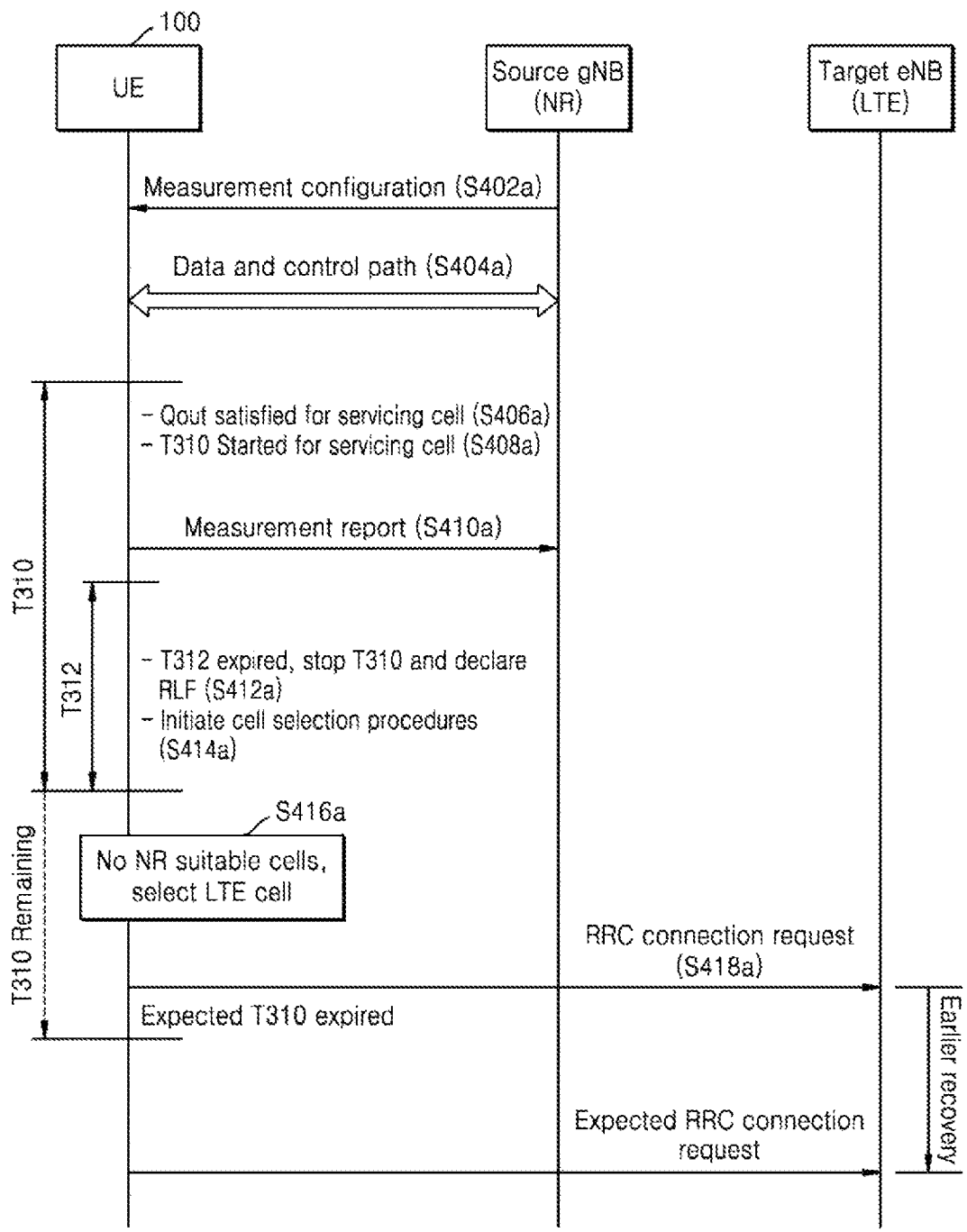
FIG. 4A is a flow diagram illustrating step by step operations for enables the UE to recover from service interruption by allowing the UE to perform connection establishment on the target cell faster than the case where T312 is not applied, according to an embodiment as disclosed herein.

FIG. 4A is a flow diagram illustrating a method for enables the UE to recover from service interruption by allowing the UE to perform connection establishment on the target cell faster than the case where T312 is not applied, according to an embodiment as disclosed herein.

After selecting a suitable cell on the target RAT (LTE cell in case of T312 expiry on NR or NR cell in case of T312 expiry on LTE), the UE does not perform re-establishment since the target cell cannot retrieve the UE context and the UE cannot re-establish to target RAT. As a result, the UE performs new connection establishment. This method enables the UE to recover from service interruption by allowing the UE to perform connection establishment on the target cell faster than the case where T312 is not applied. This procedure is illustrated in FIG. 4A.

In an example, at S402*a*, the UE (100) acquires the measurement configuration from the source gNB (i.e., NR). At S404*a*, data and control path is established between the UE (100) and the source gNB (i.e., NR). At S406*a*, the UE (100) determines that Qout is satisfied for the servicing cell. At S408*a*, the first timer (i.e., T310) is started for the servicing cell. At S410*a*, the UE (100) sends the measurement report to the source gNB (i.e., NR). At S412*a*, the T310 is expired, T310 is stopped and UE (100) declares the RLF. At S414*a*, the UE (100) initiates the cell selection procedures. At S416*a*, the UE (100) does not select the NR suitable cells and selects the LTE cell. At 418*a*, the UE (100) sends the RRC connection request to the target eNB (i.e., LTE).

Figure 4B:
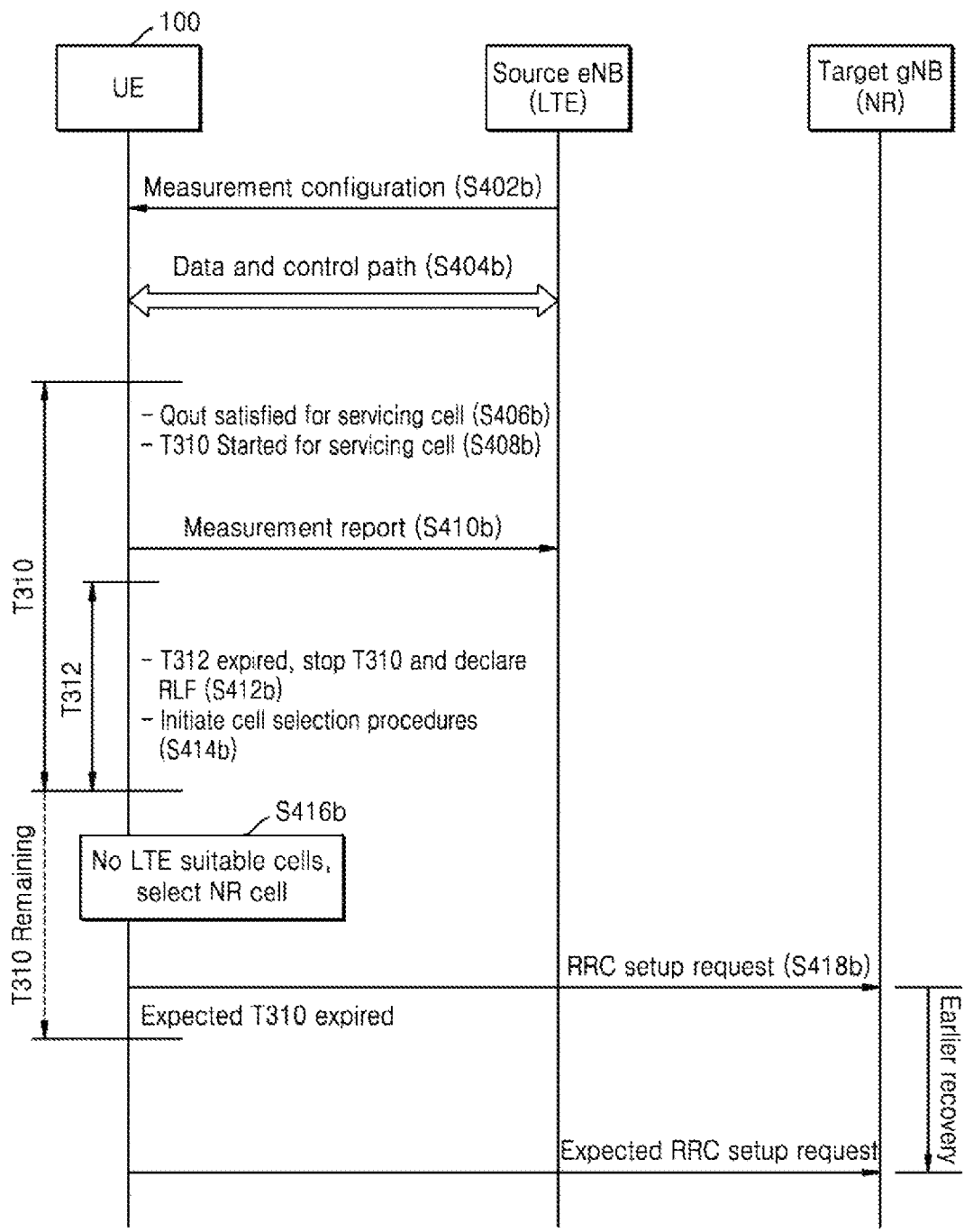
FIG. 4B is a flow diagram illustrating step by step operations for send RRC setup request from Source eNB (LTE) to Target gNB (NR) on T312 expire, according to an embodiment as disclosed herein.

FIG. 4B is a flow diagram illustrating a method for send RRC setup request from Source eNB (LTE) to Target gNB (NR) on T312 expire, according to an embodiment as disclosed herein.

In an example, at 402*b*, the UE (100) acquires the measurement configuration from the source gNB (i.e., LTE). At 404*b*, data and control path is established between the UE (100) and the source gNB (i.e., LTE). At 406*b*, the UE (100) determines that Qout is satisfied for servicing cell. At 408*b*, the first timer (i.e., T310) is started for the servicing cell. At S410*b*, the UE (100) sends the measurement report to the source gNB (i.e., LTE). At S412*b*, the T310 is expired and UE (100) declares the RLF. At 414*b*, the UE (100) initiates the cell selection procedures. At 416*b*, the UE (100) does not select the LTE cells and selects the NR cell. At 418*b*, the UE (100) sends the RRC setup request to the target eNB (i.e., NR).

Figure 5A:
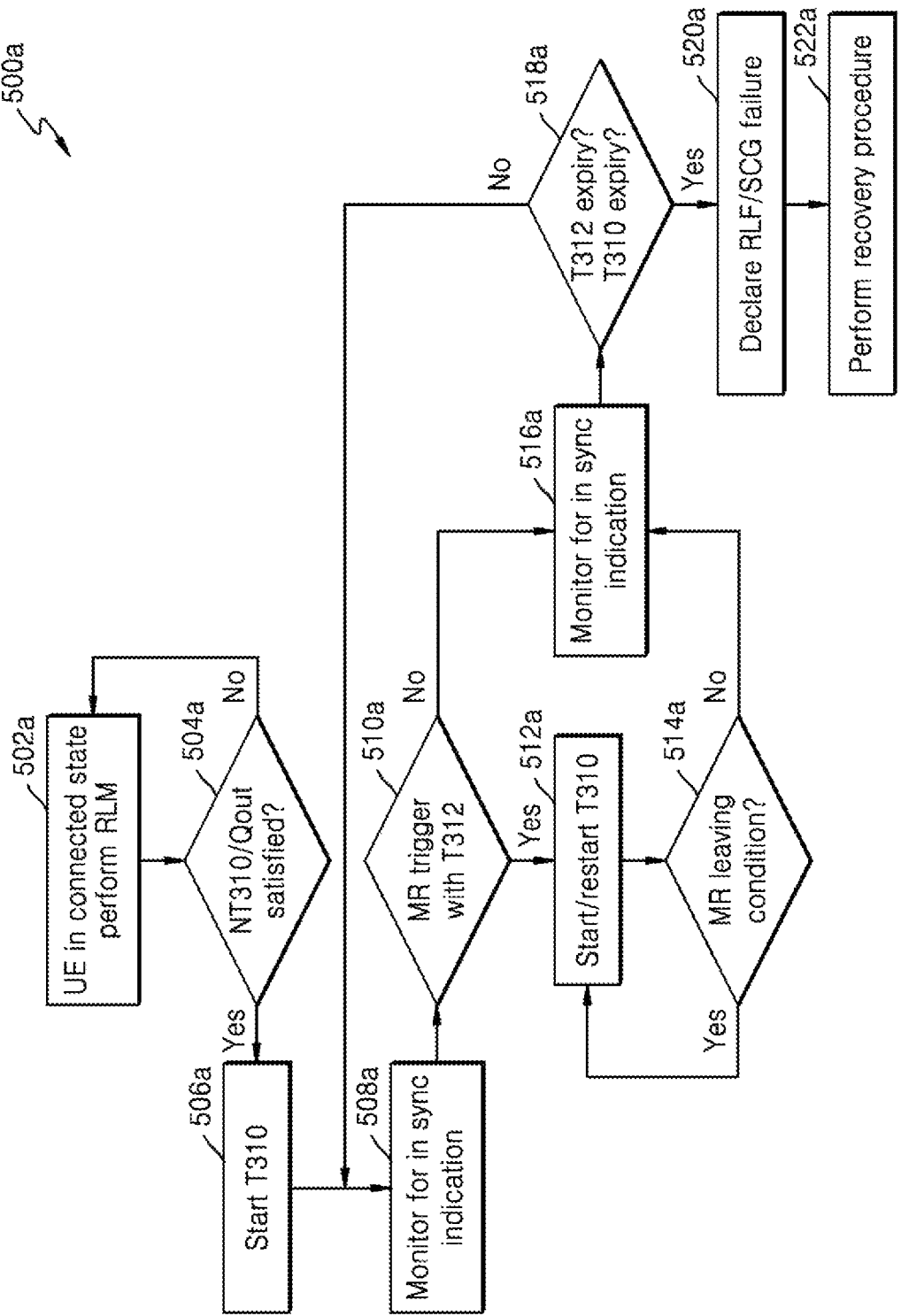
FIG. 5A is a flow diagram illustrating step by step operations to stop T312 on satisfying leaving condition, according to an embodiment as disclosed herein.

FIG. 5 is a flow diagram illustrating a method to stop T312 on satisfying leaving condition, according to an embodiment as disclosed herein.

In an embodiment, method to handle T312 on satisfying leaving condition of a reporting configuration. As seen earlier, T312 is started once T310 is running on the UE and a measurement report is triggered for an event configured to use T312. On T312 expiry, UE declares early RLF on PCell or SCG failure (i.e. early RLF on PSCell) and attempts for recovery. However, it is possible that the UE satisfies leaving condition of the event that triggered measurement report while T312 is running. This may happen either due to improvement in serving cell signal conditions or due to degradation of neighbor cell signal conditions.

In an embodiment, the method can be used to stop T312 on satisfying leaving condition, if the leaving condition is satisfied due to improvement in serving cell conditions, it is likely that the UE will return to in-sync state and can continue operating on the serving cell further. This case arise when the signal condition of the serving cell temporarily degraded due to any of short term fading or interference towards the cell edge and not necessarily because the UE is moving towards the edge of coverage of the serving cell and towards a neighbor cell coverage. There is a good probability that UE recovers the signal conditions and can sustain the radio link. In such a case, the UE can receive the handover message from the network instead of declaring an early RLF and performing recovery procedures. Therefore, it is proposed that the UE stops T312 when the UE satisfies the leaving condition of a reporting configuration for which a measurement report was transmitted to the network earlier (This is the MR that triggered the start of timer (T312).

Similarly, if leaving condition is satisfied due to degradation in the neighbor cell signal conditions, it is likely that the neighbor cell channel is not strong to sufficiently handle the UE once connected to it. In such cases, it is optimal to provide the UE with increased opportunity of recovering the serving cell by monitoring for in-sync indications. Since the leaving condition for the frequency has been satisfied due to degradation of neighbor cell signal conditions, there is no gain in declaring early RLF and attempting fast recovery as this neighbor cell may no longer be suitable. As a result, stopping T312 on satisfying the leaving condition will provide the UE with more opportunity to monitor in-sync from the serving cell as well as monitoring for other neighbor cells for which measurement reporting entry condition is satisfied and T312 may be started.

Therefore, it may benefit the UE if the timer T312 is stopped when the leaving condition for measurement configuration which started T312 is satisfied. The UE need to ensure that there is no other measurement report sent to the network when T310 is running and use-T312 is configured. If there are other measurement reports that are also sent to the network when T310 is running, UE will stop T312 only if this is the last measurement (no other measurements are still satisfying the entry condition of a reported MR) for which T312 was configured. The UE procedures based on stopping T312 when the leaving condition is satisfied is illustrated in FIG. 5.

In an example, at S502, the UE (100), in the connected state, performs the RLM. At S504, the UE (100) determines whether the NT310/Qout is satisfied? If NT310/Qout is not satisfied then, the method performs step of 502*a*. If the NT310/Qout is satisfied then, the UE (100) starts T310 at S506*a*. At S508*a*, the UE (100) monitors for in sync indication. At S510*a*, the UE determines whether the MR triggers with T312. If the MR triggers with T312 then, the UE (100) starts/restarts T310 at S512*a*. If the MR does not trigger with T312 then the UE (100) monitors for in sync indication at S516*a*.

At 514*a*, the UE (100) determines that MR leaves the condition. If the MR leaves the condition then, the UE (100) starts/restarts T310 at S512*a*. If the MR does not leave the condition then, the method performs steps at S516*a*. At 518*a*, the UE (100) determines the T312 expiry and T310 expiry. If the T312 is not expired and T310 is not expired then, the method performs steps at S508*a*. If the T312 is expired and T310 is expired then, the UE (100) declares the RLF/SCG failure at S522*a*. At S524*a*, the method performs the recovery procedure.

Figure 5B:
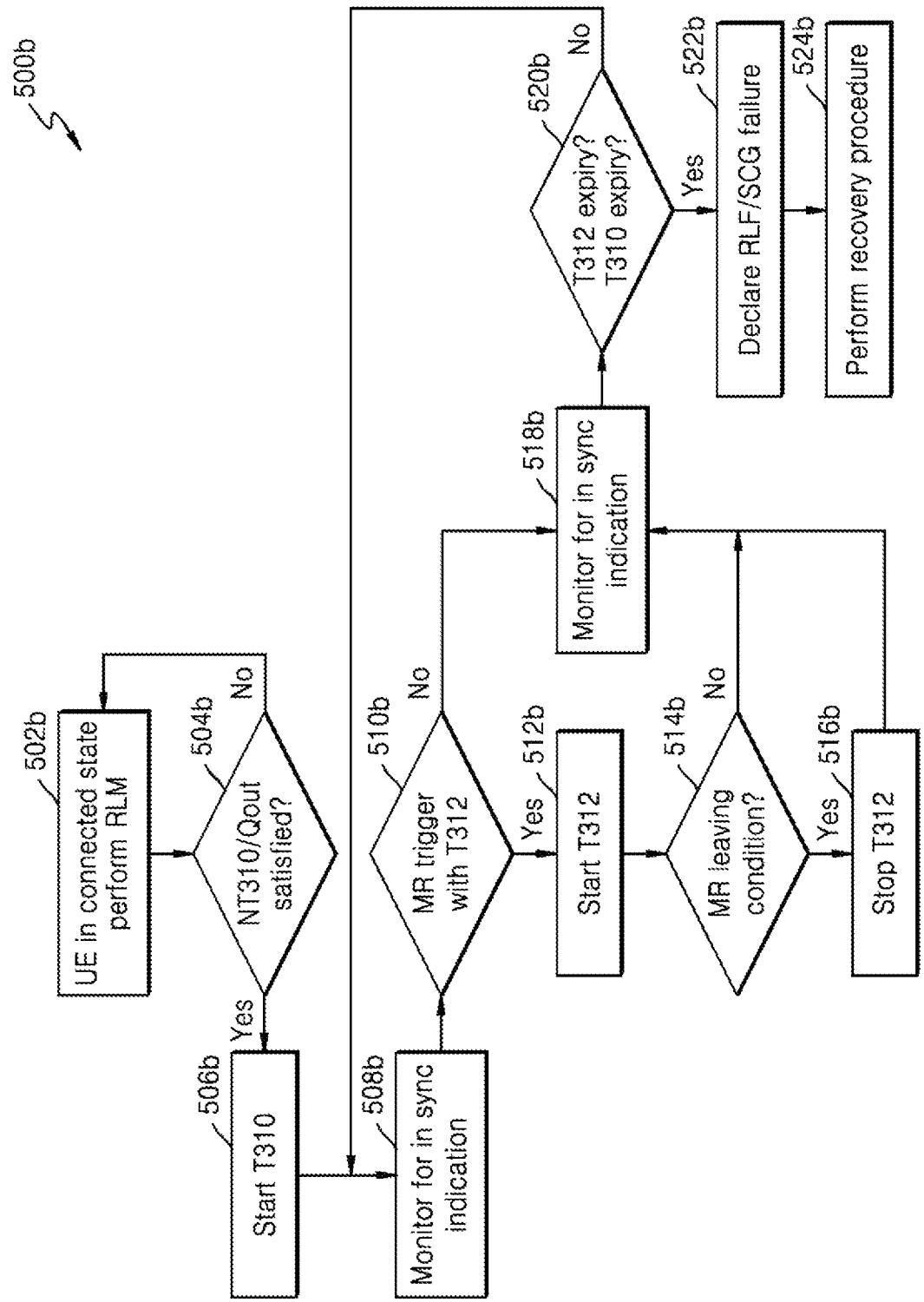
FIG. 5B is a flow diagram illustrating step by step operations to restart T312 on satisfying leaving condition, according to an embodiment as disclosed herein.

FIG. 5B is a flow diagram illustrating a method to restart T312 on satisfying leaving condition, according to an embodiment as disclosed herein.

In an example, at S502*b*, the UE (100), in the connected state, performs the RLM. At S504*b*, the UE (100) determines whether the NT310/Qout is satisfied? If NT310/Qout is not satisfied then, the method performs step of 502*b*. If the NT310/Qout is satisfied then, the UE (100) starts T310 at S506*b*. At S508*b*, the UE (100) monitors for in sync indication. At S510*b*, the UE determines whether the MR triggers with T312. If the MR triggers with T312 then, the UE (100) starts/restarts T310 at S512*b*. If the MR does not trigger with T312 then the UE (100) monitors for in sync indication at S518*b*.

At 514*b*, the UE (100) determines that MR leaves the condition. If the MR leaves the condition then, the UE (100)

stops the T312 at S516b. If the MR does not leave the condition then, the method performs steps at S518b. At 520b, the UE (100) determines the T312 expiry and T310 expiry. If the T312 is not expired and T310 is not expired then, the method performs steps at S508b. If the T312 is expired and T310 is expired then, the UE (100) declares the RLF/SCG failure at S522b. At S524b, the method performs the recovery procedure.

In an embodiment, method can be used to restart T312 on satisfying leaving condition. If the leaving condition is satisfied due to improvement in serving cell conditions, then the UE needs to ensure that this is not a momentary change as there is no time to trigger configuration associated while monitoring the leaving criteria of an event. It is possible that the serving cell measurement result indicated an improvement only during one measurement occasion and again satisfied the entering criteria in the next measurement occasion leading to a frequent fluctuating measurement at the UE. Stopping T312 during the first occasion where it satisfied the leaving criteria would result in the UE starting T312 at a later point in time when the entry criteria is satisfied again. This leads to UE being in out of sync state for longer duration than required and may work against the objective of early RLF declaration. If the serving cell signal conditions have actually improved due to which leaving condition was satisfied, it provides the UE to continue normal operation and will likely return to in sync state. The probability of correctly receiving the handover command from the network also increases. Continuing T312 when the leaving condition is satisfied would leave the UE with less time and small occasion to receive handover message from the network and to return to in-sync state.

Similarly, if leaving condition is satisfied due to degradation in the neighbor cell signal conditions, the UE needs to ensure that this is not a momentary change as there is no time to trigger configuration associated while monitoring the leaving criteria of an event. It is possible that the neighbor cell measurement result indicated a degradation only during one measurement occasion and again satisfied the entering criteria in the next measurement occasion leading to a frequent fluctuating measurement at the UE. Stopping T312 during the first occasion where it satisfied the leaving criteria would result in the UE starting T312 at a later point in time when the entry criteria is satisfied again. This leads to delay in declaring RLF when UE is in a state where there is a neighbor cell available and the serving cell is not improving. This may as well work against the objective of having early RLF detection. Had the neighbor cell signal conditions actually degraded, then continuing the timer would result in a state where the UE declares RLF but did not have any suitable cell to recover on. This also leads to reducing the UE opportunity of returning to in-sync with the serving cell which may be more probable as there are no neighbors in that area anyway.

Therefore, stopping T312 or continuing T312 during the event of a UE satisfying the leaving condition of a measurement event that triggered the start of T312 does not appear to the most suitable solution as it is dependent on the nature of signal and channel conditions that lead to those events. A more plausible approach is to come up with an approach which provides better probability of early RLF detection with reduced probability of entering into error scenarios that UE would encounter by stopping or continuing T312. Therefore, it is proposed that the UE restarts T312 when the leaving condition is first met. This way, if the change in signal condition was momentary, the UE will not have to restart the timer later and stay in the weak serving cell for a long duration. If the change in measurements are actually due to change in signal conditions, then this give added opportunity to receive handover message from the network thereby providing an opportunity of continuing service without interruption. Therefore, it may benefit the UE if the timer T312 is restarted when the leaving condition for measurement configuration which started T312 is satisfied. The UE need to ensure that there is no other measurement report sent to the network when T310 is running and use-T312 is configured. If there are other measurement reports that are also sent to the network when T310 is running, UE will restart T312 only if this is the last measurement (no other measurements are still satisfying the entry condition of a reported MR) for which T312 was configured. The sequence of procedures involved is illustrated in the flowchart on FIG. 5b.

In either of the cases where T312 is either stopped or restarted on satisfying the meeting criteria, it is imperative that the network configures repot on leave for the measurement reporting configurations required to use T312. This is essential so that the network is aware that the neighbor cell earlier reported is not strong enough for handover. This way, when the next time an event is satisfied, the UE will report the measurement report to the network and network can initiate handover with the latest and most correct measurement available.

In an embodiment, method to indicate the support of T312 in MRDC and IRAT is introduced. The network nodes should be aware of whether the UE support T312 based operation in MCG Only or SCG only or on both. The network nodes also need to be made aware of whether the UE supports T312 operation for IRAT measurement reporting as well.

In an embodiment, method to indicate to EUTRAN about the UE support of T312 or T314 or T315 timer for controlling early SCG RLF or SCG failure declaration is introduced for NE-DC. In LTE, there is already T312 defined in specification 3GPP TS 36.306 and 36.331 for handling of early RLF declaration or fast handover recovery mechanism. However, this is a feature from old release and reusing the same for SCG recovery may lead to backward compatibility issues. Therefore, a new timer say T314 or T315 has to be introduced in LTE to indicate the support of early SCG RLF declaration and fast SCG handover recovery. Otherwise, T312 may be commonly used to control early RLF declaration on both MCG and SCG. In such cases, a new UE capability for indicating support of T312 on SCG need to be sent to the network to make network aware that UE supports T312 operation on SCG as well. The following example using T314 is only an illustration and the timer name can be different (e.g.: T312 or T315). The UE capability is indicated to the network as illustrated below. The capability may also be indicated using a suffix/extension to T312 capability (e.g.: T312-SCG).

In 3GPP TS 36.306:

4.3.6.x timerT314-r16

This field defines whether the UE supports T314 as specified in TS 36.331[5]

In 3GPP TS 36.331:

```
UE-EUTRA-Capability-v1530-IEs ::= SEQUENCE {
    measParameters-v1530                MeasParameters-v1530
        OPTIONAL,
    otherParameters-v1530               Other-Parameters-v1530
        OPTIONAL,
    neighCellSI-AcquisitionParameters-v1530  NeighCellSI-AcquisitionParameters-v1530
        OPTIONAL,
    mac-Parameters-v1530                MAC-Parameters-v1530
        OPTIONAL,
    phyLayerParameters-v1530            PhyLayerParameters-v1530
        OPTIONAL,
    rf-Parameters-v1530                 RF-Parameters-v1530
        OPTIONAL,
    pdcp-Parameters-v1530               PDCP-Parameters-v1530
        OPTIONAL,
    ue-CategoryDL-v1530                 INTEGER (22..26)
        OPTIONAL,
    ue-BasedNetwPerfMeasParameters-v1530  UE-BasedNetwPerfMeasParameters-v1530
        OPTIONAL,
    rlc-Parameters-v1530                RLC-Parameters-v1530
        OPTIONAL,
    sl-Parameters-v1530                 SL-Parameters-v1530
        OPTIONAL,
    extendedNumberOfDRBs-r15            ENUMERATED {supported}
        OPTIONAL,
    reducedCP-Latency-r15               ENUMERATED {supported}
        OPTIONAL,
    laa-Parameters-v1530                LAA-Parameters-v1530
        OPTIONAL,
    ue-CategoryUL-v1530                 INTEGER (22..26)
        OPTIONAL,
    fdd-Add-UE-EUTRA-Capabilities-v1530  UE-EUTRA-CapabilityAddXDD-Mode-v1530
        OPTIONAL,
    tdd-Add-UE-EUTRA-Capabilities-v1530  UE-EUTRA-CapabilityAddXDD-Mode-v1530
        OPTIONAL,
    nonCriticalExtension                UE-EUTRA-Capability-v1610-IEs
        OPTIONAL
}
UE-EUTRA-Capability-v1610-IEs ::= SEQUENCE {
    measParameters-v1610                MeasParameters-v1610
        OPTIONAL,
    nonCriticalExtension                SEQUENCE { }
        OPTIONAL
}
```

In an embodiment, method to indicate to NR about the UE support of T312 timer for controlling early RLF in NR SA and NR-DC scenarios. In an embodiment, method to indicate to NR about the UE support of T312 timer for controlling early SCG RLF or SCG failure declaration is introduced for (NG) EN-DC. There are two ways in which this capability can be indicated to the network. One method is to indicate to the network as a common IE indicating support of T312 operation on both MCG as SCG. Another way of indicating to the network is as independent support indications (separate IEs) for T312 support of MCG and SCG. Both the methods are illustrated below:

| Definitions for parameters | Per | M | FDD-TDD diff | FR1 FR2 diff |
|---|---|---|---|---|
| csi-RS-RLM<br>Indicates whether the UE can perform radio link monitoring procedure based on measurement of CSI-RS as specified in TS38.213 [11] and TS38.133 [5] This parameter needs FR1 and FR2 differentiation. | UE | Yes | No | Yes |
| csi-RSRP-AndRSRQ-MeasWithSSB<br>indicates whether the UE can perform CSI-RSRP and CSI-RSRQ measurement as specified in TS38.215 [13], where CSI-RS resource is configured with an associated SS/PBCH. This parameter needs FR1 and FR2 differentiation. | UE | No | No | Yes. |
| csi-RSRP-AndRSRQ-MeasWithoutSSB<br>Indicates whether the UE can perform CSI-RSRP and CSI-RSRQ measurement as specified in TS38.215 [13], where CSI-RS resource is configured for a cell that transmits SS/PBCH block and without an associated SS/PBCH | UE | No | No | Yes |

-continued

| Definitions for parameters | Per | M | FDD-TDD diff | FR1 FR2 diff |
|---|---|---|---|---|
| block. This parameter needs FR1 and FR2 differentiation. | | | | |
| csi-SINR-Meas Indicates whether the UE can perform CSI-SINR measurements based on configured CSI-RS resources as specified in TS38.215 [13]. This parameter needs FR1 and FR2 differentiation. | UE | No | No | Yes |
| eventA-MeasAndReport Indicates whether the UE supports NR measurements and events A triggered reporting as specified in TS 38.331 [9] | UE | Yes | Yes | No |
| independentGapConfig This field indicates whether the UE supports two independent measurement gap configurations for FR1 and FR2 specified in TS 38.133 [5]. | UE | No | Yes | No |
| intraAndInterF-MeasAndReport Indicates whether the UE supports NR intra-frequency and inter-frequency measurements and at least periodical reporting. | UE | Yes | Yes | No |
| simultaneousRxDataSSB-DiffNumerology Indicates whether the UE supports concurrent intra-frequency measurement on serving cell or neighbouring cell and PDCCH or PDSCH reception from the serving cell with a different numerology. | UE | Tbd | Yes | Yes |
| sftd-MeasPSCell Indicates whether the UE supports SFTD measurements between the Pcell and a configured PSCell. | UE | No | Yes | No |
| sftd-MeasNR-Cell Indicates whether the SFTD measurement between the Pcell and the NR cells is supported by the UE which is capable of EN-DC when EN-DC is not configured. | UE | No | Yes | No |
| ss-SINR-Meas Indicates whether the UE can perform SS-SINR measurement as specified in TS38 215 [13] This parameter needs FR1 and FR2 differentiation. | UE | No | No | Yes |
| supportedGapPattern Indicates measurement gap pattern(s) optionally supported by the UE. The leading/leftmost bit (bit 0) corresponds to the gap pattern 2, the next bit corresponds to the gap pattern 3, as specified in TS 38.311 [9] and so on. | UE | No | No | No |
| T312 Indicates if the UE supports RLF declaration on MCG and SCG when T312 is expired | UE | No | No | No | or

| Definitions for parameter» | Per | M | FDD-TDD diff | FR1 FR2 diff |
|---|---|---|---|---|
| csi-RS-RLM Indicates whether the UE can perform radio link monitoring procedure based on measurement of CSI-RS as specified in TS38.213 [11] and 38.133 [5]. This parameter needs FR1 and FR2 differentiation. | UE | Yes | No | Yes |
| csi-RSRP-AndRSRQ-MeasWithSSB Indicates whether the UE can perform CSI-RSRP and CSI-RSRQ measurement as specified in TS38.215 [13], where CSI-RS resource is configured with an associated SS/PBCH. This parameter needs FR1 and FR2 differentiation. | UE | No | No | Yes |
| csi-RSRP-AndRSRQ-MeasWithoutSSB Indicates whether the UE can perform CSI-RSRP and CSI-RSRQ measurement as specified in TS38.215 [13], where CSI-RS resource is | UE | No | No | Yes |

-continued

| Definitions for parameter» | Per | M | FDD-TDD diff | FR1 FR2 diff |
|---|---|---|---|---|
| configured for a cell that transmits SS/PBCH block and without an associated SS/PBCH block. This parameter needs FR1 and FR2 differentiation. | | | | |
| csi-SINR-Meas Indicates whether the UE can perform CSI-SINR measurements based on configured CSI-RS resources as specified in TS38.215 [13]. This parameter needs FR1 and FR2 differentiation. | UE | No | No | Yes |
| eventA-MeusAndReport Indicates whether the UE supports NR measurements and events A triggered reporting as specified in TS 38.331 [9] | UE | Yes | Yes | No |
| independentGapConfig This field indicates whether the UE supports two independent measurement gap configurations for FR1 and FR2 specified in TS 38.133 [5] | UE | No | Yes | No |
| intraAndInterF-MeasAndReport Indicates whether the UE supports NR intra-frequency and inter-frequency measurements and at least periodical reporting. | UE | Yes | Yes | No |
| simultaneousRxDataSSB-DiffNumerology Indicates whether the UE supports concurrent intra-frequency measurement on serving cell or neighbouring cell and PDCCH or PDSCH reception from the serving cell with a different numerology | UE | Tbd | Yes | Yes |
| sftd-MeasPSCell Indicates whether the UE supports SFTD measurements between the Pcell and a configured PSCell. | UE | No | Yes | No |
| sftd-MeasNR-Cell Indicates whether the SFTD measurement between the Pcell and the NR cells is supported by the UE which is capable of EN-DC when EN-DC is not configured. | UE | No | Yes | No |
| ss-SINR-Meas Indicates whether the UE can perform SS-SINR measurement as specified in TS38.215 [13]. This parameter needs FR1 and FR2 differentiation. | UE | No | No | Yes |
| supportedGapPattern Indicates measurement gap pattern(s) optionally supported by the UE. The leading/leftmost bit (bit 0) corresponds to the gap pattern 2, the next bit corresponds to the gap pattern 3, as specified in TS 38.311 [9] and so on. | UE | No | No | No |
| T312 Indicates if the UE supports RLF declaration on MCG when T312 is expired | UE | No | No | No |
| T312-SCG Indicates if the UE supports SCG RLF or SCG failure declaration on SCG when T312 is expired | UE | No | No | No |

```
MeasAndMobParametersCommon ::=         SEQUENCE {
    supportedGapPattern         BIT STRING (SIZE (22))         OPTIONAL,
    ssb-RLM                     ENUMERATED {supported}         OPTIONAL,
    ssb-AndCSI-RS-RLM                  ENUMERATED {supported}     OPTIONAL,
    T312                                               ENUMERATED {supported}         OPTIONAL,
    ...,
    [[
    eventB-MeasAndReport            ENUMERATED {supported}     OPTIONAL,
    handoverFDD-TDD                 ENUMERATED {supported}     OPTIONAL,
```

-continued

```
    eutra-CGI-Reporting            ENUMERATED {supported}      OPTIONAL,
    nr-CGI-Reporting               ENUMERATED {supported}      OPTIONAL
    ]],
    [[
    independentGapConfig           ENUMERATED {supported}      OPTIONAL,
    periodicEUTRA-MeasAndReport            ENUMERATED {supported}
OPTIONAL,
    handoverFR1-FR2                ENUMERATED {supported}
OPTIONAL,
    maxNumberCSI-RS-RRM-RS-SINR           ENUMERATED {n4, n8, n16, n32, n64, n96}
OPTIONAL
    ]],
}
``` or

```
MeasAndMobParametersCommon ::=   SEQUENCE {
    T312   ENUMERATED {supported}        OPTIONAL,
       ...,
    }
``` or

```
MeasAndMobParametersCommon ::=       SEQUENCE {
    supportedGapPattern         BIT STRING (SIZE (22))       OPTIONAL,
    ssb-RLM                     ENUMERATED {supported}       OPTIONAL,
    ssb-AndCSI-RS-RLM               ENUMERATED {supported}
OPTIONAL,
    T312                                              ENUMERATED
{supported}            OPTIONAL,
    T312-SCG                          ENUMERATED {supported}
OPTIONAL,
    ...,
    [[
    eventB-MeasAndReport              ENUMERATED {supported}
OPTIONAL,
    handoverFDD-TDD                   ENUMERATED {supported}
OPTIONAL,
    eutra-CGI-Reporting               ENUMERATED {supported}       OPTIONAL,
    nr-CGI-Reporting                  ENUMERATED {supported}       OPTIONAL
    ]],
    [[
    independentGapConfig              ENUMERATED {supported}       OPTIONAL,
    periodicEUTRA-MeasAndReport              ENUMERATED {supported}
OPTIONAL,
    handoverFR1-FR2                   ENUMERATED {supported}
OPTIONAL,
    maxNumberCSI-RS-RRM-RS-SINR              ENUMERATED {n4, n8, n16, n32, n64, n96}
OPTIONAL
    ]],
}
    or
MeasAndMobParametersCommon ::=       SEQUENCE {
    T312                              ENUMERATED {supported}
OPTIONAL,
    T312-SCG                          ENUMERATED {supported}
OPTIONAL,
       ...,
}
```

In another embodiment, In NR it is required to inform the network about the UE support of T312 based early RLF declaration on NR when IRAT EUTRAN based measurement report is triggered. Similarly, in LTE In NR, indication of UE capability for IRAT T312 based early RLF declaration from NR to EUTRAN it is required to inform the network about the UE support of T312 based early RLF declaration on LTE when IRAT NR based measurement report is triggered. The same is illustrated below:

On NR (3GPP TS 38.331), T312 support for early RLF declaration when EUTRAN measurement report is triggered.

```
        MeasAndMobParametersCommon ::=    SEQUENCE {
            supportedGapPattern           BIT STRING (SIZE (22))       OPTIONAL,
```

-continued

```
        ssb-RLM                    ENUMERATED {supported}              OPTIONAL,
        ssb-AndCSI-RS-RLM              ENUMERATED {supported}
OPTIONAL,
            T312-EUTRA                                              ENUMERATED
{supported}         OPTIONAL,
        ...,
        [[
        eventB-MeasAndReport           ENUMERATED {supported}
OPTIONAL,
        handoverFDD-TDD                ENUMERATED {supported}
OPTIONAL,
            eutra-CGI-Reporting    ENUMERATED {supported}              OPTIONAL,
            nr-CGI-Reporting       ENUMERATED {supported}              OPTIONAL
        ]],
        [[
        independentGapConfig           ENUMERATED {supported}          OPTIONAL,
        periodicEUTRA-MeasAndReport        ENUMERATED {supported}
OPTIONAL,
        handoverFR1-FR2                ENUMERATED {supported}
OPTIONAL,
            maxNumberCSI-RS-RRM-RS-SINR        ENUMERATED {n4, n8, n16, n32, n64, n96}
OPTIONAL
        ]],
    }
    or
MeasAndMobParametersCommon ::=       SEQUENCE {
T312-EUTRA                           ENUMERATED {supported}            OPTIONAL,
    ...,
}
```

On LTE (3GPP TS 36.331), T312 support for early RLF declaration when EUTRAN measurement report is triggered.

4.3.6. x timerT312-r16: This field defines whether the UE supports T312 based RLF when NR measurement report is triggered as specified in TS 36.331 [5].

Figure 6:
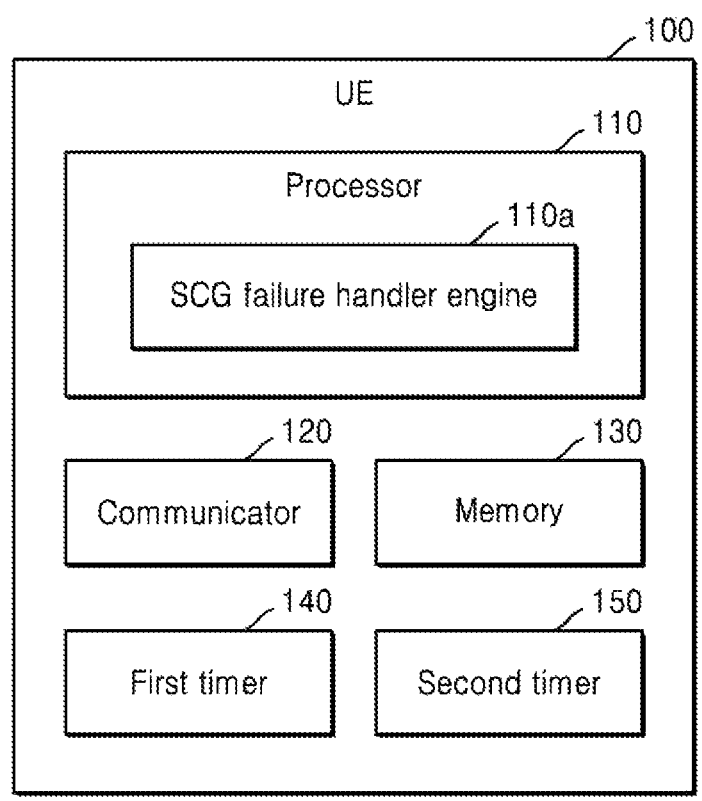
FIG. 6 is schematic view of the UE for handling the RLF in the wireless communication system, according to embodiments as disclosed herein.

FIG. 6 is schematic view of the UE (100) for handling the RLF in the wireless communication system, according to embodiments as disclosed herein. The UE (100) can be, for example but not limited to a Unmanned Aerial Vehicle (UAV), an airplane, a cellular phone, a tablet, a smart phone, a laptop, a Personal Digital Assistant (PDA), a global positioning system, a multimedia device, a video device, an internet of things (IoT) device, a smart watch, a game console, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The UE (100) includes a processor (110) having a SCG failure handling engine (110a), a communicator (120), a memory (130), the first timer (140) and the second timer (150). The processor (110) is coupled with the communicator (120), the memory (130), the first timer (140) and the second timer (150).

The SCG failure handling engine (110a) receives the measurement configuration including the second timer (150) from the SN (300). Further, the SCG failure handling engine (110a) configures the UE (100) with the second timer (150) associated with the measurement report for the PScell. Further, the SCG failure handling engine (110a) starts the second timer (150) when the measurement report is triggered while the first timer (140) for the PSCell is running. Further, the SCG failure handling engine (110a) detect the expiry of one of: the first timer (140) and the second timer (150) for the PSCell. Further, the SCG failure handling engine (110a) declares the SCG RLF upon expiry of one of the first timer (140) and the second timer (150) whichever is early. Further, the SCG failure handling engine (110a) initiates a SCG failure procedure towards a MN (200) upon declaring the SCG RLF.

In an embodiment, the processor (110) is configured to notify a SCG failure message to the master node (200) over a SRB1 via a Master Cell Group (MCG) link upon declaring the SCG RLF. The SCG failure information includes a cause value corresponding to a failure type as one of: the expiry of the first timer (140) and the expiry of the second timer (150).

In an embodiment, the processor (110) is configured to set the failure type as one of the first timer expiry and the second timer expiry.

In an embodiment, the processor (110) sets the failure type as the first timer expiry, if the expiry of the first timer (140) is before the expiry of the second timer (150), else the processor (110) sets the failure type as the second timer expiry, if the expiry of the second timer (150) is before the expiry of the first timer (140).

In an embodiment, the processor (110) is configured to receive a measurement object and reporting configuration including the second timer (150) from the SN (300). The second timer (150) is associated with the measurement report for the PSCell of the SN (300).

In an embodiment, the SCG RLF is declared by stopping the first timer (140) based on the detection of the expiry of the second timer (150) for the PSCell. In an embodiment, the SCG RLF is declared by stopping the second timer (150) based on the detection of the expiry of the first timer (150) for the PSCell.

In an embodiment, the first timer (140) is a T310 timer, wherein the first timer (140) is included during a SCG addition, and the second timer (150) is a T312 timer wherein the second timer (150) is included in the measurement configuration from the SN (300)

In an embodiment, the measurement report is sent to the SN (300) over one of a SRB1 and the SRB3.

The processor (110) is configured to execute instructions stored in the memory (130) and to perform various processes. The communicator (120) is configured for communicating internally between internal hardware components and with external devices via one or more networks and/or MN (200) and the SN (300).

The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 6 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to handle the RLF in the wireless communication system.

Figure 7:
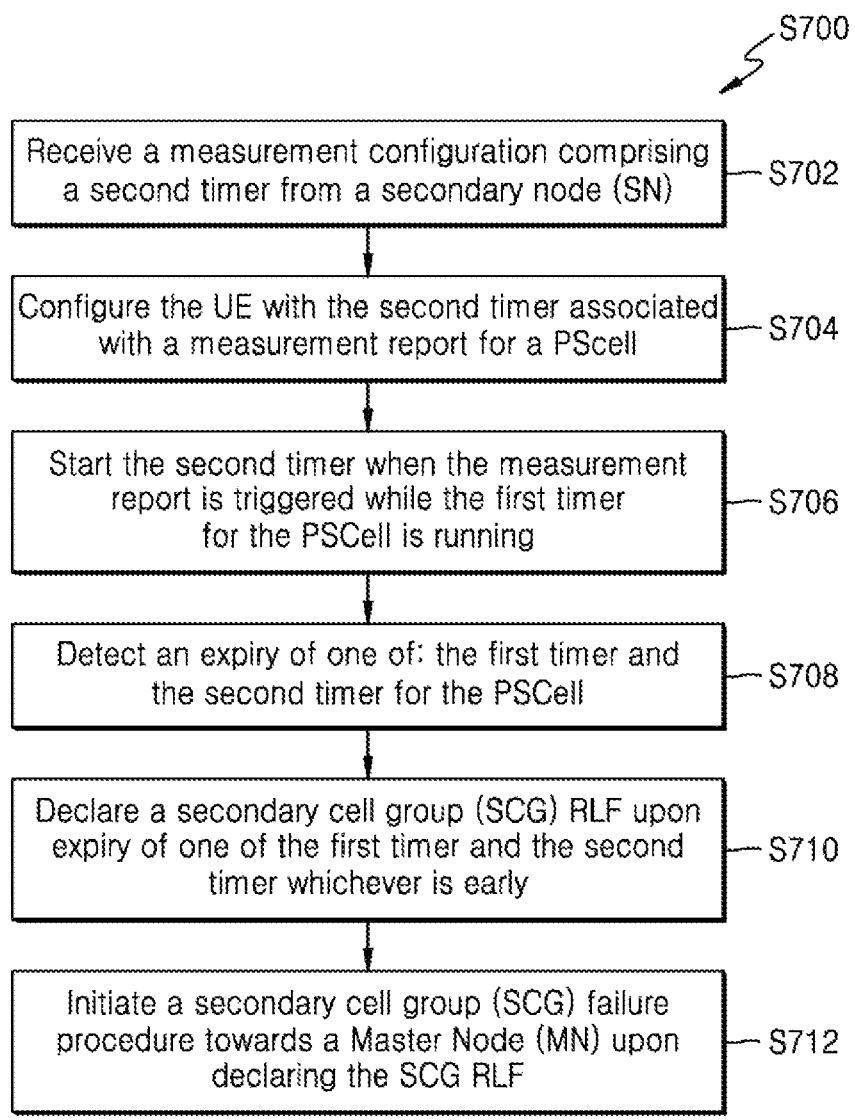
FIG. 7 is a flow chart illustrating a method for handling the RLF in the wireless communication system, according to embodiments as disclosed herein.

FIG. 7 is a flow chart (S700) illustrating a method for handling the RLF in the wireless communication system, according to embodiments as disclosed herein. The operations (S702-S708) are performed by the processor (110).

At S702, the method includes receive a measurement configuration comprising a second timer (150) from the SN (300). At S704, the method includes configure the UE (100) with the second timer (150) associated with the measurement report for the PScell. At S706, the method includes starting the second timer (150) when the measurement report is triggered while the first timer (140) for the PSCell is running. At S708, the method includes detecting an expiry of one of: the first timer (140) and the second timer (150) for the PSCell. At S710, the method includes declaring the SCG RLF upon expiry of one of the first timer (140) and the second timer (150) whichever is early. At S712, the method includes initiating the SCG failure procedure towards the MN (200) upon declaring the SCG RLF.

The embodiments disclosed herein can be implemented using at least one software program running on at least one hardware device and performing network management functions to control the elements.

The various actions, acts, blocks, steps, or the like in the flow chart (S700) may be performed in the order presented, in a different order or simultaneously. Further, in some embodiments, some of the actions, acts, blocks, steps, or the like may be omitted, added, modified, skipped, or the like without departing from the scope of the invention.

Figure 8:
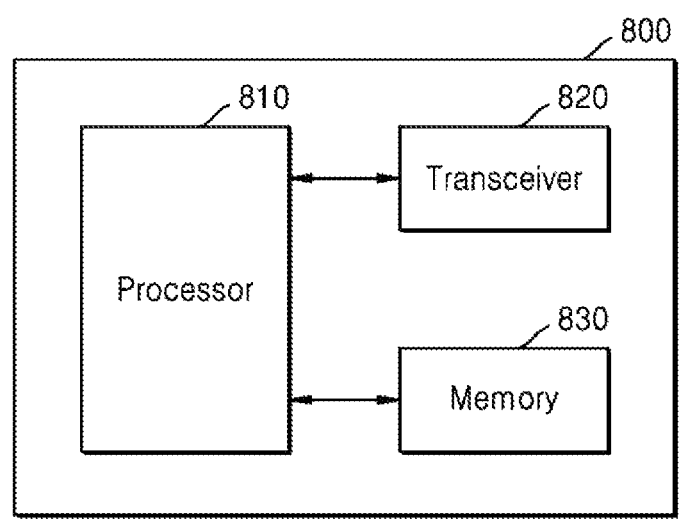
FIG. 8 is a diagram illustrating a base station according to another embodiment of the present disclosure.

FIG. 8 is a diagram illustrating a base station 800 according to another embodiment of the present disclosure.

Referring to the FIG. 8, the base station 800 may include a processor 810, a transceiver 820 and a memory 830. However, all of the illustrated components are not essential. The base station 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the base station 800 may be implemented by the processor 810.

The processor 810 may obtain at least one timer information including timer 312 for RLF on secondary cell group (SCG). The processor 810 may control the transceiver to transmit control information including the obtained timer information. The processor 810 may, based on the timer 312 being expired at a user equipment (UE), control the transceiver to receive SCG failure information indicating the timer 312 expiry as a cause of the RLF on the SCG.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the base station 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling a radio link failure (RLF) in a wireless communication system comprising a master cell group (MCG) and a secondary cell group (SCG) the method comprising:
   receiving, a radio resource control (RRC) reconfiguration message including measurement configuration information for the SCG, via a signaling radio bearer 3 (SRB 3);
   identifying that a measurement report type is set to event-triggered and a measurement report event for the SCG is triggered, based on report configuration information for the SCG including information indicating use of a T312 timer;

in case that the information indicating the use of the T312 timer is included in the report configuration information for the SCG and a T310 timer is running, starting the T312 timer based on the measurement configuration information for the SCG, including a value of the T312 timer;

based on an expiry of the T312 timer on a primary SCG cell (PSCell), declaring a RLF of the SCG; and transmitting, via a signaling radio bearer 1 (SRB 1), a SCG failure message including a cause value corresponding to a failure type as the expiry of the T312 timer.

2. The method of claim 1, wherein the SCG failure message is transmitted via MCG transmission, upon declaring the RLF of the SCG.

3. A User Equipment (UE) configured to handle a radio link failure (RLF) in a wireless communication system comprising a master cell group (MCG) and a secondary cell group (SCG) the UE comprising:

a transceiver; and a processor coupled with the transceiver and configured to:

receive a radio resource control (RRC) reconfiguration message including measurement configuration information for the SCG, via a signaling radio bearer 3 (SRB 3);

identify that a measurement report type is set to event-triggered and a measurement report event for the SCG is triggered, based on report configuration information for the SCG including information indicating use of a T312 timer;

in case that the information indicating the use of the T312 timer is included in the report configuration information for the SCG and a T310 timer is running, start the T312 timer based on the measurement configuration information for the SCG, including a value of the T312 timer;

based on an expiry of the T312 timer on a primary SCG cell (PSCell), declare a RLF of the SCG; and transmit, via a signaling radio bearer 1 (SRB 1), a SCG failure message including a cause value corresponding to a failure type as the expiry of the T312 timer.

4. The UE of claim 3, wherein the SCG failure message is transmitted via MCG transmission, upon declaring the RLF of the SCG.

* * * * *